(12) United States Patent
Usui

(10) Patent No.: US 12,705,649 B2
(45) Date of Patent: Aug. 11, 2026

(54) METHODS AND SYSTEMS FOR PREDICTING A PRICE OF ANY SUBTRACTIVELY MANUFACTURED PART UTILIZING ARTIFICIAL INTELLIGENCE AT A COMPUTING DEVICE

(71) Applicant: PROTO LABS, INC., Maple Plain, MN (US)

(72) Inventor: Shuji Usui, Minneapolis, MN (US)

(73) Assignee: PROTO LABS, INC., Maple Plain, MN (US)

( * ) Notice: Subject to any disclaimer, the term of this patent is extended or adjusted under 35 U.S.C. 154(b) by 87 days.

(21) Appl. No.: 18/808,451

(22) Filed: Aug. 19, 2024

(65) Prior Publication Data

US 2024/0412266 A1 Dec. 12, 2024

Related U.S. Application Data

(63) Continuation-in-part of application No. 18/225,828, filed on Jul. 25, 2023, now Pat. No. 12,086,849,
(Continued)

(51) Int. Cl.
*G06Q 30/0283* (2023.01)
*G06F 18/23* (2023.01)
(Continued)

(52) U.S. Cl.
CPC ......... *G06Q 30/0283* (2013.01); *G06F 18/23* (2023.01); *G06N 20/00* (2019.01); *G06T 1/20* (2013.01); *G06V 10/762* (2022.01)

(58) Field of Classification Search
CPC ........... G06Q 30/0208; G06Q 30/0206; G06N 20/00; G06F 18/23; G06V 10/762
See application file for complete search history.

(56) References Cited

U.S. PATENT DOCUMENTS 7,305,367 B1 * 12/2007 Hollis .................... B33Y 80/00
700/157
8,239,284 B2 8/2012 Lukis et al.
(Continued)

FOREIGN PATENT DOCUMENTS

WO 2001077781 A2 10/2001

OTHER PUBLICATIONS

Pahwa, Deepak & Starly, Binil. (2019). Network Based Pricing for 3D Printing Services in Two-Sided Manufacturing-as-a-Service Marketplace.

(Continued)

*Primary Examiner* — Dylan C White
(74) *Attorney, Agent, or Firm* — Caldwell LLC

(57) ABSTRACT

A method for predicting a price of any subtractively manufactured part utilizing artificial intelligence at a computing device. The method comprises receiving a part model, identifying at least an element of mechanical part data as a function of the part model, extracting at least an identified element of the mechanical part data, selecting a correlated dataset comprising a plurality of data entries as a function of the extracted element of the mechanical part data, generating at least a part revision datum for the plurality of correlated manufacturing data, determining a pricing datum as a function of the extracted element of the mechanical part data and the correlated manufacturing data, and generating a graphical user interface displaying the mechanical part data and the part revision datum on a user device.

20 Claims, 16 Drawing Sheets

Related U.S. Application Data which is a continuation of application No. 16/706,562, filed on Dec. 6, 2019, now Pat. No. 11,783,389.

(51) Int. Cl.

| | |
|---|---|
| ***G06N 20/00*** | (2019.01) |
| ***G06T 1/20*** | (2006.01) |
| ***G06V 10/762*** | (2022.01) |

(56) References Cited

U.S. PATENT DOCUMENTS

| | | | | |
|---|---|---|---|---|
| 10,929,904 | B1 * | 2/2021 | Jacobs, II | G06Q 30/0611 |
| 11,392,857 | B1 | 7/2022 | Dohrn | |
| 11,429,070 | B2 | 8/2022 | Leng et al. | |
| 11,449,793 | B2 | 9/2022 | Neumann | |
| 11,535,954 | B2 | 12/2022 | Czinner et al. | |
| 11,574,084 | B1 | 2/2023 | Marusich et al. | |
| 11,783,389 | B2 | 10/2023 | Usui | |
| 2009/0125418 | A1 | 5/2009 | Lukis et al. | |
| 2014/0067479 | A1 | 3/2014 | Stacklin et al. | |
| 2015/0127131 | A1 | 5/2015 | Herrman et al. | |
| 2015/0127480 | A1 | 5/2015 | Herrman et al. | |
| 2017/0032283 | A1 | 2/2017 | Kamiya | |
| 2017/0323319 | A1 * | 11/2017 | Rattner | G06N 20/00 |
| 2019/0339688 | A1 | 11/2019 | Cella et al. | |
| 2020/0042889 | A1 * | 2/2020 | Lin | G06Q 50/04 |
| 2020/0401113 | A1 | 12/2020 | Yuan et al. | |
| 2022/0138619 | A1 | 5/2022 | Neumann | |
| 2022/0261830 | A1 * | 8/2022 | Malik | G06Q 30/0201 |
| 2023/0042464 | A1 | 2/2023 | Atev | |
| 2023/0153850 | A1 * | 5/2023 | Hauser | G06Q 30/0283<br>705/7.35 |
| 2023/0214721 | A1 | 7/2023 | Neumann | |
| 2023/0281651 | A1 * | 9/2023 | Kleinikkink | G06Q 30/0206<br>705/7.31 |
| 2023/0289860 | A1 | 9/2023 | Usui | |

OTHER PUBLICATIONS

Miller, C. (Aug. 15, 2024). CNC machining is more accessible than you may think. Manufacturing.net. https://www.manufacturing.net/industry40/article/13245730/cnc-machining-is-more-accessible-than-you-may-think#:~:text=Although%20it's%20been%20around%20since,easily%20available%20to%20more%20professionals.

* cited by examiner

METHODS AND SYSTEMS FOR PREDICTING A PRICE OF ANY SUBTRACTIVELY MANUFACTURED PART UTILIZING ARTIFICIAL INTELLIGENCE AT A COMPUTING DEVICE

CROSS-REFERENCE TO RELATED APPLICATIONS

This application is a continuation-in-part of U.S. patent application Ser. No. 18/225,828, filed on Jul. 25, 2023, and entitled "METHODS AND SYSTEMS FOR PREDICTING A PRICE OF ANY SUBTRACTIVELY MANUFACTURED PART UTILIZING ARTIFICIAL INTELLIGENCE AT A COMPUTING DEVICE," which is a continuation of U.S. patent application Ser. No. 16/706,562, filed on Dec. 6, 2019, now U.S. Pat. No. 11,783,389, issued on Oct. 10, 2023, and entitled "METHODS AND SYSTEMS FOR PREDICTING A PRICE OF ANY SUBTRACTIVELY MANUFACTURED PART UTILIZING ARTIFICIAL INTELLIGENCE AT A COMPUTING DEVICE," each of which is incorporated by reference herein in its entirety.

FIELD OF THE INVENTION

The present invention generally relates to the field of computer-aided design and structure fabrication. In particular, the present invention is directed to methods and systems for predicting a price of any subtractively manufactured part utilizing artificial intelligence at a computing device.

BACKGROUND

Technical specifications and computer-aided drawings typically convey a variety of information about a to-be-fabricated structure, such as a part or an assembly of components of a mechanical part. Examples of such information includes information about geometry, materials, finishes, connections, hardware, special processes, dimensions, tolerances, and the like as known in the art. The wide array of information about a to-be-fabricated structure within the technical specification and/or computer-aided drawings can lead to challenges when determining a market price for the structure, such as an inability to properly predict tool path, milling time, tooling setup time, material cost, removed volume and/or area, and the like.

Inability to obtain data for the vast collection of possible to-be fabricated structures have driven manufacturing costs to be analyzed in view of only part size, which causes several problems and disadvantages. Utilizing only part size creates a scope so limited as to neglect other key variables affecting the cost of manufacturing. For instance, the time it takes to mill a part is dependent on the features in the parts, such as pocket, hole, boss, grooving, channel, and the material inevitably affecting the cost to fabricate, such as aluminum is relatively soft and as a result quicker to mill therefore less expensive to use as a material of manufacture. Thus, it is extremely challenging to maintain a level of consistency when pricing mechanical parts for manufacture.

SUMMARY OF THE DISCLOSURE

In an aspect, a method for making prediction associated with a subtractively manufactured part using artificial intelligence at a computing device is disclosed. The method includes receiving, by a computing device, a part model, identifying, by the computing device, at least an element of mechanical part data as a function of the part model, extracting, by the computing device, at least an identified element of the mechanical part data, selecting, by the computing device, a correlated dataset including a plurality of data entries as a function of the extracted element of the mechanical part data, wherein each data entry includes a plurality of correlated manufacturing data, and wherein the plurality of correlated manufacturing data further includes at least a requirement fulfillment record from past quality assurance data, generating, by the computing device, at least a part revision datum for the plurality of correlated manufacturing data, determining, by the computing device, a pricing datum as a function of the extracted element of the mechanical part data and the correlated manufacturing data, wherein determining the pricing datum further includes generating pricing training data, wherein the pricing training data includes exemplary part revision data correlated to exemplary pricing data, training, iteratively, a pricing machine-learning model using the pricing training data and generating the pricing datum as a function of the pricing machine-learning model and generating, by the computing device, a graphical user interface displaying the manufacturing part data and the part revision datum on a user device.

In another aspect, a system for making prediction associated with any subtractively manufactured part using artificial intelligence is disclosed. The system includes at least a processor and a memory communicatively connected to the at least a processor, wherein the memory contains instructions configuring the at least a processor to receive a part model, identify at least an element of mechanical part data as a function of the part model, extract at least an identified element of the mechanical part data, select a correlated dataset including a plurality of data entries as a function of the extracted element of the mechanical part data, wherein each data entry includes a plurality of correlated manufacturing data, and wherein the plurality of correlated manufacturing data further includes at least a requirement fulfillment record from past quality assurance data, generate at least a part revision datum for the plurality of correlated manufacturing data, determine a pricing datum as a function of the extracted element of the mechanical part data and the correlated manufacturing data, wherein determining the pricing datum further includes generating pricing training data, wherein the pricing training data includes exemplary part revision data correlated to exemplary pricing data, training, iteratively, a pricing machine-learning model using the pricing training data and generating the pricing datum as a function of the pricing machine-learning model and generate a graphical user interface displaying the manufacturing part data and the part revision datum on a user device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for predicting a price of any subtractively manufactured part utilizing artificial intelligence at a computing device. Embodiments of the systems and methods herein describe a means for predicting a price ratio of any CNC mechanical part utilizing artificial intelligence by a novel process which generates an external price output as a function of relating the manufacturing request datum to at least a part element and determines a price ratio as a function of the external price output. In an embodiment, the price ratio is determined by receiving a manufacturing request datum, which further comprises at least an element of user mechanical part data, selecting a correlated dataset containing a plurality of data entries, generating at least a first correlated compatible part element at a clustering unsupervised machine-learning model, receiving a first training set, and by generating an external price output at a supervised machine-learning model.

Figure 1:
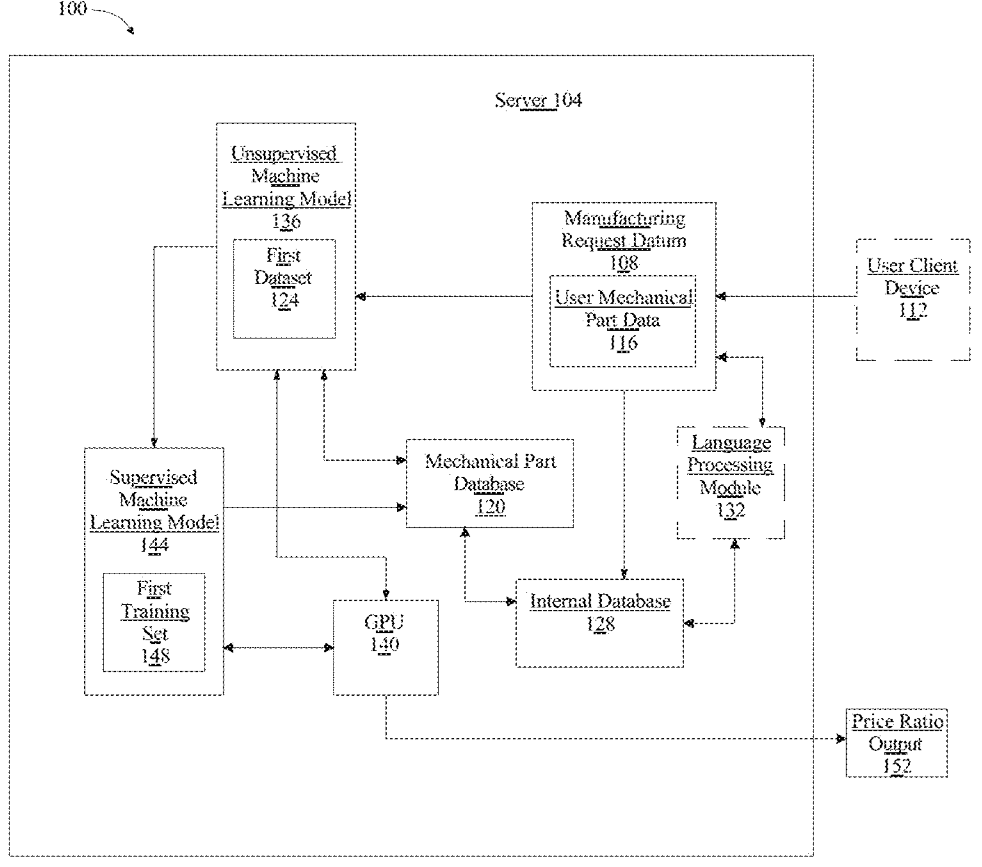
FIG. 1 illustrates is a high-level block diagram of an exemplary system for predicting a price of any subtractively manufactured part utilizing artificial intelligence at a computer device.

Referring now to FIG. 1, a block diagram of system 100 for predicting a price of a CNC mechanical part using artificial intelligence is presented. System 100 is configured to determine a price ratio as a function of the external price output and can include server 104, manufacturing request datum 108, user mechanical part data 116, user client device 112, unsupervised machine-learning model 136, first dataset 124, mechanical part database 120, internal database 128, graphics processing unit (GPU) 140, supervised machine-learning model 144, first training set 148, external price output 500, and any combination thereof.

Still referring to FIG. 1, system 100 is configured to include server 104. server 104 may include any computing device as described herein, including without limitation a microcontroller, microprocessor, digital signal processor (DSP) and/or system on a chip (SoC) as described herein. Server 104 may be housed with, may be incorporated in, or may incorporate one or more sensors of at least a sensor. Computing device may include, be included in, and/or communicate with a mobile device such as a mobile telephone or smartphone. Server 104 may include a single computing device operating independently, or may include two or more computing device operating in concert, in parallel, sequentially or the like; two or more computing devices may be included together in a single computing device or in two or more computing devices. Server 104 with one or more additional devices as described below in further detail via a network interface device. Network interface device may be utilized for connecting a server 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Server 104 may include but is not limited to, for example, a server 104 or cluster of computing devices in a first location and a second computing device or cluster of computing devices in a second location. Server 104 may include one or more computing devices dedicated to data storage, security, distribution of traffic for load balancing, and the like. Server 104 may distribute one or more computing tasks as described below across a plurality of computing devices of computing device, which may operate in parallel, in series, redundantly, or in any other manner used for distribution of tasks or memory between computing devices. Server 104 may be implemented using a "shared nothing" architecture in which data is cached at the worker, in an embodiment, this may enable scalability of system 100 and/or computing device.

With continued reference to FIG. 1, system 100 is configured to receive a manufacturing request datum 108 from a user client device 112. The manufacturing request datum 108 further comprises at least an element of user mechanical part data. Manufacturing request datum 108, as used herein, includes any data describing and/or relating to a request for manufacture of at least a CNC mechanical part. Request for manufacture, as used herein, includes a buyer inviting the supplier to submit a bid on the buyer's specific manufacturing inquiry. A bid, as described herein, includes an estimated cost to manufacture the buyer's desired manufacturing inquiry. A request for manufacture may include, without limitation, a price quote, a price request, a quote request, a pricing enquiry, price prediction, and the like. A request for manufacture may further include, without limitation, a computer model of a subtractively manufactured part. A computer model, as described herein, is a digital model of a physical structure as created using computer-aided design (CAD) modeling software. For example and without limitation, computer-aided design (CAD) software may include SOLIDWORKS® software and/or CATIA software (available from Dassault Systèmes SolidWorks Corp, Waltham, Massachusetts), AUTOCAD® software and/or Fusion 360 software (available from Autodesk, Inc., San Rafael, California), PTC Creo software (available from PTC, Inc., Boston, Massachusetts), Siemens NX software (available from Siemens PLM Software, Plano, Texas) and MICROSTATION® software (available from Bentley Systems, Inc., Exton, Pennsylvania), and the like. The computer model may include any modeling type, such as, without limitation, a wireframe, solid model and/or any combination thereof. The computer model may be saved in a computer file using any suitable file protocol, such as, without limitation, SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and/or the like. The computer model further includes information about the geometry and/or other defining properties of the mechanical part's structure.

Continuing to refer to FIG. 1, manufacturing request datum 108 includes at least an element of user mechanical part data 116. User mechanical part data 116, as used herein, includes any descriptive attributes of the manufacturing request datum 108. Descriptive attributes, as used herein, are any features, limitations, details, restrictions and/or specifications of the manufacturing request datum 108. Descriptive attributes may include, without limitation, any features, limitations, details, restrictions and/or specifications relating to the CNC mechanical part geometry, materials, finishes, connections, hardware, special processes, dimensions, tolerances, and the like. Descriptive attributes may further include, without limitation, any features, limitations, details, restrictions, and/or specifications relating to the total request for manufacture, such as total amount of CNC mechanical parts, restrictions on deadline to have request completed, and the like. As an example and without limitation, user mechanical part data 116 may include part count data that contains the total number of each CNC mechanical part included in the manufacturing request datum 108, such as a request to have a total number of 24 brackets manufactured. As a further example and without limitation, user mechanical part data 116 may include part face count data that contains the total number of faces on the CNC mechanical part included in the manufacturing request datum 108, such as a price request to have a hollow box with a total of 10 faces manufactured. As another example and without limitation, user mechanical part data 116 may include part material data that contains the material to which the user desired to have the CNC mechanical part of the manufacturing request datum 108 manufactured, such as a quote request for a titanium roller bushing. Persons skilled in the art, upon reviewing the entirety of this disclosure, will be aware of various descriptive attributes which may be suitable for use user mechanical part data consistently with this disclosure.

With continued reference to FIG. 1, a user client device 112 may include, without limitation, a transmission of communication with at least a server 104; transmission may include any transmission as described herein. A user client device 112 may include an additional computing device, such as a mobile device, laptop, desktop computer, or the like; as a non-limiting example, the user client device 112 may be a computer and/or workstation operated by an engineering professional. Persons skilled in the art, upon reviewing the entirety of this disclosure, will be aware of various devices which may be suitable for use as user client device consistently with this disclosure.

Still referring to FIG. 1, server 104 is configured to select at least a correlated dataset containing a plurality of data entries wherein each dataset contains at least a datum of mechanical part data and at least a first correlated compatible part element as a function of the at least a manufacturing request datum 108. Mechanical part data, as used herein, includes any of the data suitable for use as user mechanical part data 116, as described above. Datasets may be selected and contained within mechanical part database 120 as described below in more detail in reference to FIG. 2.

With continued reference to FIG. 1, each dataset contains at least a datum of body data and at least a first correlated compatible part element. Correlated compatible part element, as used herein, includes any element of data identifying and/or describing any characteristic of a CNC mechanical part that may affect, modify and/or have an influence on the manufacturing process as a function of the manufacturing request datum 108. Characteristics of a CNC mechanical part that may affect, modify and/or have an influence on the manufacturing process, as used herein, include any detail of the manufacturing request datum 108 that may impact limitations of the manufacturing process, such as milling time, milling cost, tool path and/or tool selection. Correlated compatible part element may include for example a particular characteristic such as, one horizontal hole included in the mechanical part, three hollow openings included in the mechanical part, and 12 cooling fins included in the CNC mechanical part. Characteristics may include a category of CNC mechanical part characteristics that may be categorized as having a shared attribute or trait. For example and without limitation, characteristics may include categories such as including horizontal holes, including vertical holes, similar traits of manufacturing materials, such as fracture toughness, flexibility, conductivity, corrosion resistance, and the like, including gear features, including threading, diameter, length, design for manufacturability, volume, and the like. In an embodiment, at least a datum of mechanical part data is correlated with a compatible part element where the element of mechanical part data is located in the same data element and/or portion of data element as the mechanical part data. For example and without limitation, and element of mechanical part data is correlated with a compatible part element where both element of mechanical part data and compatible part element are contained within the same first dataset 124. For instance and without limitation, mechanical part data showing a request for a quantity of 10,000 parts may be correlated to a compatible part element such as a mechanical part machines by limited tool sets which is shown to improve scalability by decreasing the amount of times the machine would be required to change tools. In another example and without limitation, mechanical part data showing a desire for a cooling fin may be correlated to a compatible part element such as aluminum which is thermal conductor, absorbing heat quickly, and a common material for cooling fins because of this attribute. In yet another non-limiting example, mechanical part data showing a need to withstand a load above a certain threshold may be correlated to a compatible part element such as titanium which is recognized for its high strength-to-weight ratio.

With continued reference to FIG. 1, dataset containing plurality of data entries wherein each dataset contains at least a datum of mechanical part data and a first correlated compatible part element may be stored in mechanical part database 120 as described in more detail below in reference to FIG. 2. Mechanical part database 120 may be implemented, without limitation, as a relational database, a key-value retrieval datastore such as a NOSQL database, or any other format or structure for use as a datastore that a person skilled in the art would recognize as suitable upon review of the entirety of this disclosure. Dataset may be stored in any suitable data and/or data type. For instance and without limitation, dataset may include textual data, such as numerical, character, and/or string data. Textual data may include a standardized name and/or code for in-process and/or post-processing manufacturing, or the like; codes may include raw material codes, dimensional codes, calibration codes, mechanical and/or thermal testing codes, safety codes, and/or data formatting codes, which may include without limitation codes used in CAD 3D geometry, assembly and PMI standards such as STEP AP242 and ASME Y14.5 geometric dimensioning and tolerancing (GD&T) symbols. In general, there is no limitation on forms textual data or non-textual data used as dataset may take; persons skilled in the art, upon reviewing the entirety of this disclosure, will be aware of various forms which may be suitable for use as dataset consistently with this disclosure.

Still referring to FIG. 1, dataset may be stores as image data, such as for example an image of a particular CNC mechanical part, such as a computer model of a threaded bolt, a computer-aided design of a stainless-steel endcap, or a tool path of a hollow box. Image data may be stored in various forms including for example, joint photographic experts group (JPEG), exchangeable image file format (Exif), tagged image file format (TIFF), graphics interchange format (GIF), portable network graphics (PNG), netpbm format, portable bitmap (PBM), portable any map (PNM), high efficiency image file format (HEIF), still picture interchange file format (SPIFF), better portable graphics (BPG), drawn filed, enhanced compression wavelet (ECW), flexible image transport system (FITS), free lossless image format (FLIF), graphics environment manage (GEM), portable arbitrary map (PAM), personal computer exchange (PCX), progressive graphics file (PGF), Gerber formats, 2 dimensional vector formats, 3 dimensional vector formats, compound formats including both pixel and vector data such as encapsulated postscript (EPS), portable document format (PDF), SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and stereo formats.

Continuing to refer to FIG. 1, datasets contained within mechanical part database 120 may be obtained from an internal database. Internal database 128 may be implemented, without limitation, as a relational database, a key-value retrieval datastore such as a NOSQL database, or any other format or structure for use as a datastore that a person skilled in the art would recognize as suitable upon review of the entirety of this disclosure. Internal database 128 may include data entries reflecting one or more request for manufacture. The request for manufacture may include any request for manufacture as described above. Request for manufacture may include requests submitted according to any process, including without limitation by using user client device 112. User client device may include any user client device as described above. System 100 is further configured to store manufacturing request datum 108 in internal database 128.

With continued reference to FIG. 1, data information describing significant categories and/or features of mechanical part data and/or relationships of such categories to compatible part element may be extracted from one or more documents using a language processing module 132. Language processing module 132 may include any hardware and/or software module, such as a processor, memory, field-programmable gate array (FPGA), microprocessor, controller, microcontroller, graphics processing unit, central processing unit, and the like. Language processing module 132 may be configured to extract from the one or more documents, one or more words. One or more words may include, without limitation, strings of one or characters, including without limitation any sequence or sequences of letters, numbers, punctuation, diacritic marks, engineering symbols, geometric dimensioning and tolerancing (GD&T) symbols, formulas American Society for Testing and Materials (ASTM) Standards, such as technical standards for materials, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module 132 may compare extracted words to categories of mechanical part data recorded by the server 104, and/or one or more categories of compatible part elements recorded by the server 104; such data for comparison may be entered on the server 104 using manufacturing request datum and the like. In an embodiment, one or more categories may be enumerated, to find total count of mentions in such documents. Alternatively or additionally, language processing module 132 may operate to produce a language processing model. Language processing model may include a program generated the server 104 and/or language processing module 132 to produce associations between one or more words extracted from at least a document and detect associations, including without limitation mathematical associations, between such words, and/or associations of extracted words with categories of user input 988 datums, relationships of such categories to first probing elements, and/or categories of first probing elements. Associations between language elements, where language elements include for purposes herein extracted words, categories of user input 988 datums, relationships of such categories to first probing elements, and/or categories of first probing elements may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of user input 988 datum, a given relationship of such categories to a first probing element, and/or a given category of a first probing element. As a further example, statistical correlations and/or mathematical associations may include probabilistic formulas or relationships indicating a positive and/or negative association between at least an extracted word and/or a given category of mechanical part data, a given relationship of such categories to compatible part element, and/or a given category of compatible part element; positive or negative indication may include an indication that a given document is or is not indicating a category of mechanical part data, relationship of such category to a first compatible part element, and/or category of compatible part element is or is not significant. For instance and without limitation, a negative indication may be determined from a phrase such as, "material is not compatible with anodizing" whereas a positive indication may be determined from a phrase such as, "A mechanical part with varying diameter vertical holes was found to be compatible with multiple drills." A phrase, sentence, word, or other textual element in a document or corpus of documents constituting a positive or negative indicator may be determined, in an embodiment, by mathematical associations between detected words, comparisons to phrases and/or words indicating positive and/or negative indicators, are stored in memory by the server 104, or the like.

Continuing to refer to FIG. 1, language processing module 132 and/or server 104 may generate the language processing model by any suitable method, including without limitation, a speech recognition algorithm. The language processing model may include an automatic speech to text model to enable the recognition and/or translation of spoken language into text. The automatic speech to text model may include acoustic modeling and/or language modeling. The automatic speech to text model may include, as an example and without limitation, a Hidden Markov Model (HMM). HMMs, as used herein, are statistical models with inference algorithms that that may be applied to the models., as described in further detail below. As an example and without limitation, the automatic speech to text model may include dynamic time warping (DTW)-based speech recognitional. Dynamic time warping, as used herein, is an algorithm for measuring similarity between two sequences that may vary in speed. As a further example and without limitation, the automatic speech to text model may include neural networks, wherein a neural network is designed to recognize patterns by utilizing thousands and/or millions of simple processing nodes that are densely interconnected. Neural networks may be used in the speech recognition algorithm for multiple aspects of speech recognitional such as phoneme classification, isolated work recognition, audiovisual speech recognition, audiovisual speaker recognition, speaker adaptation, and the like. The automatic speech to text model may further be configured to include, as a non-limiting example, end-to-end automatic speech recognition. End-to end automatic speech recognition, as described herein, is a system that directly maps input audio sequence to sequence of words or other graphemes, such as directly learning to map speech acoustics to different language characters.

Still referring to FIG. 1, language processing module 132 and/or server 104 may further generate the language processing model, without limitation, utilizing a natural language processing classification algorithm. The language processing model may include a natural language process classification model that enumerates and/or derives statistical relationships between input term and output terms. An algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted word category of mechanical part, a given relationship of such categories to compatible part elements, and/or a given category of compatible part elements. There may be a finite number of categories of mechanical part data a given relationship of such categories to a compatible part element, and/or a given category of part elements to which an extracted word may pertain. An HMM inference algorithm, such as the forward-backward algorithm or the Viterbi algorithm, may be used to estimate the most likely discrete state given a word or sequence of words. Language processing module 132 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating a language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module 132 may parse the manufacturing request datum 108 for the element of user mechanical part data and match the element of user mechanical part data to a correlated dataset containing at least an element of the mechanical part data. In an embodiment, datasets contained within mechanical part database may be categorized by CNC mechanical part characteristics, as described in more detail below in reference to FIG. 2. Language processing module 132 may match at least a dataset by extracting one or more keywords containing words, phrases, test results, numerical scores, and the like from manufacturing request datum 108 and analyze the one or more keywords, as described in more detail below. Language processing module 132 may be configured to normalize one or more words or phrases of user input 988, where normalization signifies a process whereby one or more words or phrases are modified to match corrected or canonical forms. For instance, misspelled words may be modified to correctly spelled versions, words with alternative spellings may be converted to spellings adhering to a selected standard, such as American or British spellings, capitalizations and apostrophes may be corrected, and the like; this may be performed by reference to one or more "dictionary" data structures listing correct spellings and/or common misspellings and/or alternative spellings, or the like.

With continued reference to FIG. 1, language processing module 132 may extract and/or analyze one or more words or phrases by performing dependency parsing processes. A dependency parsing process may be a process whereby language processing module 132 recognizes a sentence or clause and assigns a syntactic structure to the sentence or clause. Dependency parsing may include searching for or detecting syntactic elements such as subjects, objects, predicates or other verb-based syntactic structures, common phrases, nouns, adverbs, adjectives, and the like. Such detected syntactic structures may be related to each other using a data structure and/or arrangement of data corresponding, as a non-limiting example, to a sentence diagram, parse tree, or similar representation of syntactic structure. Language processing module 132 may be configured, as part of dependency parsing, to generate a plurality of representations of syntactic structure, such as a plurality of parse trees, and select a correct representation from the plurality; this may be performed, without limitation, by use of syntactic disambiguation parsing algorithms such as, without limitation, Cocke-Kasami-Younger (CKY), Earley algorithm or Chart parsing algorithms. Disambiguation may alternatively or additionally be performed by comparison to representations of syntactic structures of similar phrases as detected using vector similarity, by reference to machine-learning algorithms and/or modules.

Still referring to FIG. 1, server 104 may include an unsupervised machine-learning model 136. Unsupervised machine-learning model 136 may operate on the server and/or another computing device in communication with the server 104, which may include any hardware and/or software module. The server 104 is configured to generate, at unsupervised machine-learning model 136, at least a compatible part element as a function of the manufacturing request datum and the correlated dataset. An unsupervised machine-learning process, as used herein, is a process that derives inferences in datasets without regard to labels; as a result, an unsupervised machine-learning process may be free to discover any structure, relationship, and/or correlation provided in the data. For instance, and without limitation, unsupervised machine-learning module and/or server 104 may perform an unsupervised machine-learning process on a first data set, which may cluster data of first data set according to detected relationships between elements of the first data set, including without limitation correlations of elements of mechanical part data to each other and correlations of compatible part elements to each other; such relations may then be combined with supervised machine-learning results to add new criteria for at supervised machine-learning processes as described in more detail below. As a non-limiting, illustrative example, an unsupervised process may determine that a first mechanical part datum correlates closely with a second mechanical part datum, where the first element has been linked via supervised learning processes to a given compatible part element, but the second has not; for instance, the second mechanical part datum may not have been defined as an input for the supervised learning process, or may pertain to a domain outside of a domain limitation for the supervised learning process. Continuing the example a close correlation between first mechanical part datum and second mechanical part datum may indicate that the second mechanical part datum is also a good predictor for the compatible part element; second mechanical part datum may be included in a new supervised process to derive a relationship or may be used as a synonym or proxy for the first mechanical part datum.

With continued reference to FIG. 1, unsupervised machine-learning model 136 may include any method of cluster analysis which outputs a hierarchy of clusters. Cluster analysis, as used herein, includes any grouping of objects such as datasets in such a way that datasets in the same group or cluster are more similar to each other than to those in other clusters. Cluster analysis may include hard clustering and/or soft clustering. Hard clustering may include clustering where each dataset belongs to any particular cluster or not. Soft clustering may include clustering where each dataset may belong to a cluster to a certain degree such as a certain percentage of belonging to any given cluster or a likelihood of belonging to a given cluster. Hierarchical clustering may group and/or segment datasets with shared attributes to extrapolate algorithmic relationships. Unsupervised machine-learning model 136 may include generating various algorithms that may work to find clusters that may be generated based on parameter settings such as distance functions to use, density threshold, and optimal of clusters to generate. Unsupervised machine-learning model 136 may include models such as but not limited to connectivity models, centroid models, distribution models, density models, subspace models, group models, graph-based models, signed graph models, neural models, and the like.

Still referring to FIG. 1, unsupervised machine-learning model 136 may include agglomerative and/or divisive hierarchical clustering. Agglomerative hierarchical clustering may include a bottom-up approach whereby each observation may start in its own cluster, and pairs of clusters may be merged as one moves up the hierarchy. Divisive hierarchical clustering may include a top-down approach whereby all observations may start in one cluster and splits may be performed recursively moving down the hierarchy.

With continued reference to FIG. 1, system 100 may include a graphic processing unit (GPU) 140 operating on the server 104. As described herein, GPU 140 may include a device with a set of specific hardware capabilities that are intended to map well to the way that various 3D engines execute their code, including geometry setup and execution, texture mapping, memory access, and shaders. GPU 140 may include, without limitation, a specialized electronic circuit designed to rapidly manipulate and alter memory to accelerate the creation of images in a frame buffer. For instance, and without limitation, GPU 140 may include a computer chip that performs rapid mathematical calculations, primarily for the purpose of rendering images. GPU 140 may further include, without limitation, full scene anti-aliasing (FSAA) to smooth the edges of 3-D objects and anisotropic filtering (AF) to make images look crisper. GPU 140 may include, without limitation, dedicated graphics cards, integrated graphics cards, hybrid graphics cards, and/or any combination thereof. GPU 140 may be configured to calculate the volume removed by each tool of the plurality of tools for the at least a correlated compatible part element as a function of the at least an internal request datum. GPU 140 may be further configured to calculate the material removal rate of each tool of the plurality of tools for the at least a correlated compatible part element as a function of the at least an internal request datum. GPU 140 may be further configured to calculate the surface area finished by each tool of the plurality of tools for the at least a correlated compatible part element as a function of the at least an internal request datum. GPU 140 may be further configured to calculate the area removal rate for each tool of the plurality of tools for the at least a correlated compatible part element.

Continuing to refer to FIG. 1, system 100 may include a supervised machine-learning model 144 operating on the server 104. Supervised machine-learning model 144 is configured to receive a first training set 148. Receiving the first training set 148 may include receiving the first training set 148 from the unsupervised machine-learning model 136. The first training set 148 is received as a function of the at least and element of user mechanical part data and the at least a second correlated compatible part element. The first training set 148 is configured to include the correlated database. The correlated dataset may include any correlated dataset as described in detail above.

With continued reference to FIG. 1, supervised machine-learning model 144 may include, without limitation, models developed using linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Still referring to FIG. 1, supervised machine-learning algorithms may include without limitation, linear discriminant analysis. Machine-learning algorithm may include quadratic discriminate analysis, kernel ridge regression, and/or support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors' algorithms, Gaussian processes, such as Gaussian Process Regression, cross-decomposition algorithms, including partial least squares and/or canonical correlation analysis, and/or naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

With continued reference to FIG. 1, supervised machine-learning algorithms may include using alternatively or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using any training set as described herein; the trained network may then be used to apply detected relationships between elements of user input 988 datums and antidotes.

With continuing reference to FIG. 1, training data, as used herein, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name and/or a description of a medical condition or therapy may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

With continued reference to FIG. 1, supervised machine-learning model 144 is further configured to generate an external price output. The external price output is generated as a function of relating the manufacturing request datum to at least a part element. The external price output, as described herein, is the industry determined price to fulfill the manufacturing request datum 108 as a function of the plurality of manufacturing request datum 108 stored in internal database 128. The external price output is described in further detail below in reference to FIG. 5.

Still referring to FIG. 1, system 100 is further designed and configured to determine a price ratio output 152. A price ratio, as described herein, is the internal cost to fulfill the manufacturing request datum 108 divided by the external price output. A price ratio output 152 is determined as a function of the external price output. Determining a price ratio output 152 further comprises generating a loss function of part specific variables and minimizing the loss function. Part specific variables, as described herein, includes any descriptive attributes of the mechanical part for manufacture. Descriptive attributes, as used herein, are any features, limitations, details, restrictions and/or specifications of the mechanical part for manufacture. Descriptive attributes may include, without limitation, any features, limitations, details, restrictions and/or specifications relating to the CNC mechanical part geometry, materials, finishes, connections, hardware, special processes, dimensions, tolerances, and the like. Descriptive attributes may further include, without limitation, any features, limitations, details, restrictions, and/or specifications relating to the total request for manufacture, such as volume of CNC mechanical parts within the manufacturing request datum 108, restrictions on deadline to have request completed, and the like. As an example and without limitation, part specific variables may include the total number of each CNC mechanical part included in the manufacturing request datum 108, such as a request to have a total number of 1,200 cooling fins manufactured. As a further example and without limitation part specific variables may include the total number of faces on the CNC mechanical part included in the manufacturing request datum 108, such as a price request to have a mechanical part with a total of 18 faces manufactured. As another example and without limitation, part specific variables may the material to which the user desired to have the CNC mechanical part of the manufacturing request datum 108 manufactured, such as a quote request for a mechanical part, or parts, manufactured out of aluminum alloy. Persons skilled in the art, upon reviewing the entirety of this disclosure, will be aware of various descriptive attributes which may be suitable for use as part specific variables consistently with this disclosure.

With continued reference to FIG. 1, system 100 may include determining a predictive close rate as a function of the price ratio output 152. Determining a predictive close rate may include evaluating the price ratio output to be above or below a determined threshold. The determined threshold, as described herein, may include a value to which the internal price exceeds the external price output and/or a value to which the internal price does not meet the external price output. As an example and without limitation, determining a predictive close rate may include evaluating the price ratio output to be below the determined threshold indicates a higher close rate. A close rate, as described herein, is the rate of the likelihood of a client and/or user opportunity, such as manufacturing request datum 108, being closed, or won, such as a user agreeing to fulfill manufacturing request datum 108. As a further example and without limitation, determining a predictive close rate may include evaluating the price ratio output to be above the determined threshold indicates a lower close rate. Persons skilled in the art, upon reviewing the entirety of this disclosure, will be aware of various means of determining a predictive close rate as a function of the price ratio output which may be suitable for use consistently with this disclosure.

Figure 2:
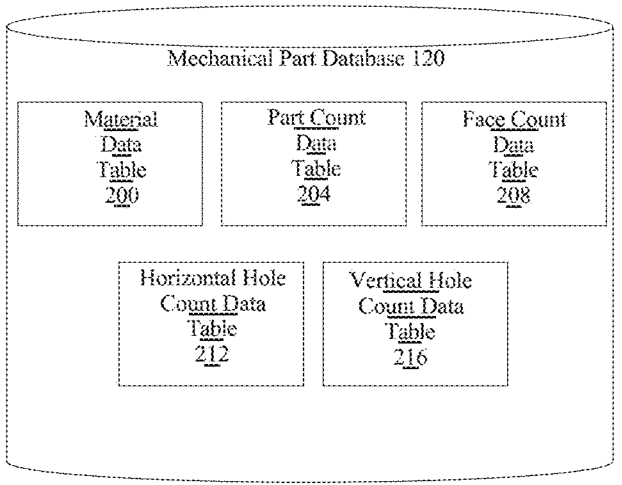
FIG. 2 illustrates a block diagram of an embodiment of a mechanical part database.

Referring now to FIG. 2, an embodiment of mechanical part database 120 is illustrated. Mechanical part database 120 may be implemented as a hardware and/or software module. Mechanical part database 120 may be implemented, without limitation, as a relational database, a key-value retrieval datastore such as a NOSQL database, or any other format or structure for use as a datastore that a person skilled in the art would recognize as suitable upon review of the entirety of this disclosure. Mechanical parts database 120 may contain datasets that may be utilized by unsupervised machine-learning model 136 to find trends, cohorts, and shared datasets between data contained within mechanical part database 120 and manufacturing request datum 108. In an embodiment, datasets contained within mechanical part database 120 may be categorized and/or organized according to shared characteristics. For instance and without limitation, one or more tables contained within mechanical part database 120 may include material data table 200. Material data table 200 may contain datasets classified to material information of user mechanical part data 116 of manufacturing request datum 108. Material information may include datasets describing metals, ASTM material standards, thermoplastics, thermosets, ceramics, graphite, biodegradable materials, medical and biochemical materials, nylons, acetals, polycarbonates, and the like. One or more tables contained within mechanical part database 120 may include part count data table 204. Part count data table 204 may include datasets classified by the total amount of parts for manufacture contained in manufacturing request datum 108. The part count may contain datasets describing total amount of parts for manufacture, for example and without limitation, by directly matching the numbers of parts for manufacture in manufacturing request datum 108, a range of numbers of parts for manufacture, a minimum and/or maximum threshold of numbers of parts for manufacture, and the like. One or more tables contained within mechanical part database 120 may include face count data table 208. Face count data table 208 may include datasets classified by the total amount of faces on the part for manufacture contained in the manufacturing request datum 108. The face count data table may contain datasets describing the total amount of faces on the part for manufacture, for example and without limitation, by directly matching the number of faces on the part for manufacture contained within manufacturing request datum 108, a range of number of faces on the part for manufacture, a minimum and/or maximum threshold of faces on the part for manufacture, and the like. One or more tables contained within mechanical part database 120 may include horizontal hole count data table 212. Horizontal hole count data table 212 may include datasets classified by the total number of horizontal holes on the part for manufacture contained in the manufacturing request datum 108. The horizontal hole count data table may contain datasets describing the total number of horizontal holes contained in the part for manufacture, for example and without limitation, by directly matching the number of horizontal holes on the part for manufacture contained in manufacturing request datum 108, a range of numbers of horizontal holes in the part for manufacture, a minimum and/or maximum threshold of numbers of horizontal holes in the part for manufacture, and the like. One or more tables contained within mechanical part database 120 may include vertical hole count data table 216. Vertical hole count data table 216 may include datasets classified by the total number of vertical holes on the part for manufacture contained in the manufacturing request datum 108. The vertical hole count data table may contain datasets describing the total number of vertical holes contained in the part for manufacture, for example and without limitation, by directly matching the number of vertical holes on the part for manufacture contained in manufacturing request datum 108, a range of numbers of vertical holes in the part for manufacture, a minimum and/or maximum threshold of numbers of vertical holes in the part for manufacture, and the like.

Figure 3:
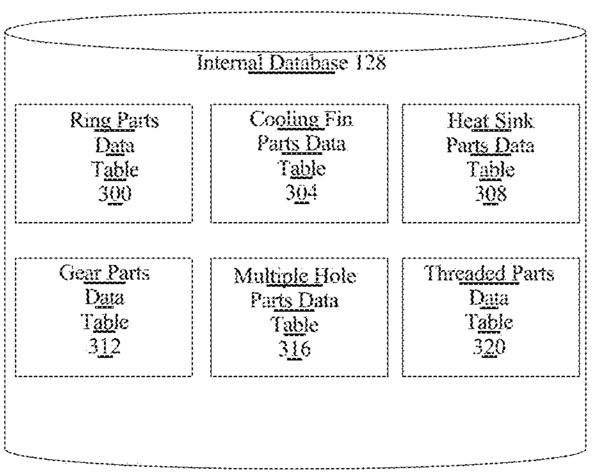
FIG. 3 illustrates a block diagram illustrating an embodiment of an internal database.

Referring now to FIG. 3, an embodiment of internal database 128 is illustrated. Internal database 128 may be implemented as a hardware and/or software module. Internal database 128 may include any data structure for ordered storage and retrieval of data. Internal database 128 may be implemented as any database structure suitable for use as mechanical part database 120. As described in further detail above in reference to FIG. 1, internal database 128 may include stored manufacturing request datum 108. One or more tables in internal database 128 may include, as a non-limiting example, ring parts data table 300. Ring parts data table 300 may include data classified by the ring shape configuration of the part for manufacture included in manufacturing request datum 108. The ring part data table may contain data describing mechanical parts with ring shape configurations that were included in manufacturing request datum 108. One or more tables in internal database 128 may include cooling fin parts data table 304. Cooling fin parts data table 304 may include data classified by the cooling fin configuration of the part for manufacture included in manufacturing request datum 108. The cooling fin part data table may contain data describing mechanical parts with cooling fin configurations that were included in manufacturing request datum 108. Cooling fins, as described herein, are projections that increase the surface area from which heat can be radiated away from a device. The fins project outwards making the area for emitting heat internally smaller than the area emitting heat externally. One or more tables in internal database 128 may include heat sink parts data table 308. Heat sink data table 308 may include data classified by the heat sink configuration of the part for manufacture included in manufacturing request datum 108. The heat sink part data table may contain data describing mechanical parts with heat sink configurations that were included in manufacturing request datum 108. Heat sinks, as described herein, are objects that absorbs and dissipates heat from another object using thermal contact. One or more tables contained in internal database 128 may include gear parts data table 312. Gear parts data table 312 may include data classified by the gear configuration of the part for manufacture included in manufacturing request datum 108. The gear part data table may contain data describing mechanical parts with gear configurations that were included in manufacturing request datum 108. One or more data tables contained within internal database 128 may include multiple hole parts data table 316. Multiple hole parts data table 316 may include data classified by the multiple hole configuration of the part for manufacture included in manufacturing request datum 108. The multiple hole part data table may contain data describing mechanical parts with multiple hole configurations that were included in manufacturing request datum 108. One or more data tables contained within internal database 128 may include threaded parts data table 320. Threaded parts data table 320 may include data classified by the threaded configuration of the part for manufacture included in manufacturing request datum 108. The threaded part data table may contain data describing mechanical parts with threaded configurations that were included in manufacturing request datum 108. Threaded parts, as described herein, include parts containing a helical structure used to convert between rotational and linear movement or force.

Figure 4:
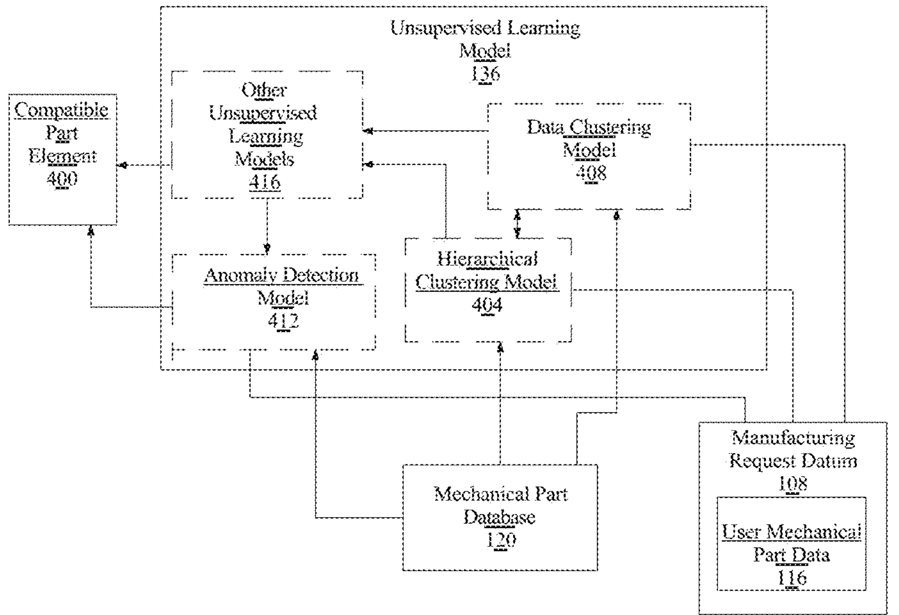
FIG. 4 illustrates a schematic representation illustrating an embodiment of a clustering unsupervised machine-learning model.

Referring now to FIG. 4, an embodiment of unsupervised machine-learning model 136 is illustrated. Unsupervised learning may include any of the unsupervised learning processes as described herein. Unsupervised machine-learning model 136 includes any clustering unsupervised machine-learning model as described herein. Unsupervised machine-learning model 136 generates at least a second correlated compatible parts element 400. The at least a second correlated compatible parts element 400 is generated as a function of the manufacturing request datum 108 and the correlated dataset. Correlated dataset may be selected from mechanical part database 120 as described herein. Mechanical part database 120 may contain data describing different characteristics of manufacturing request datum 108, such as geometric, volume, surface area, material, number of tools required, deadline to complete request, and the like, which may be organized into categories contained within mechanical part database 120 as described above in more detail in reference to FIG. 2. Unsupervised machine-learning model may further include a hierarchical clustering model 404. Hierarchical clustering model 404 may group and/or segment datasets into hierarchy clusters including both agglomerative and divisive clusters. Agglomerative clusters may include a bottom up approach where each observation starts in its own cluster and pairs of clusters are merged as one moves up the hierarchy. Divisive clusters may include a top down approach where all observations may start in one cluster and splits are performed recursively as one moves down the hierarchy. In an embodiment, hierarchical clustering model 404 may analyze datasets obtained from mechanical part database 120 to find observations which may each initially form own cluster. Hierarchical clustering model 404 may then identify clusters that are closest together and merge the two most similar clusters and continue until all clusters are merged together. Hierarchical clustering model 404 may output a dendrogram which may describe the hierarchical relationship between the clusters. Distance between clusters that are created may be measured using a suitable metric. Distance may be measured between for example the two most similar parts of a cluster known as single linkage, the two least similar bits of a cluster known as complete-linkage, the center of the clusters known as average-linkage or by some other criterion which may be obtained based on input received from internal database 128, as an example.

With continued reference to FIG. 4, unsupervised machine-learning model 136 may perform other unsupervised machine-learning models to output at least a compatible part element 400. Unsupervised machine-learning model 136 may include a data clustering model 408. Data clustering model 408 may group and/or segment datasets with shared attributes to extrapolate algorithmic relationships. Data clustering model 408 may group data that has been labelled, classified, and/or categorized. Data clustering model 408 may identify commonalities in data and react based on the presence or absence of such commonalities. For instance and without limitation, data clustering model 408 may identify other data sets that contain the same or similar characteristics of the part for manufacture contained within manufacturing request datum 108 or identify other datasets that contain parts with similar attributes and/or differentiations. In an embodiment, data clustering model 408 may cluster data and generate labels that may be utilized as training set data. Data clustering model 408 may utilize other forms of data clustering algorithms including for example, hierarchical clustering, k-means, mixture models, OPTICS algorithm, and DBSCAN.

With continued reference to FIG. 4, unsupervised machine-learning model 136 may include an anomaly detection model 412, Anomaly detection model 412 may include identification of rare items, events or observations that differ significant from the majority of the data. Anomaly detection model 412 may function to observe and find outliers. For instance and without limitation, anomaly detect may find and examine data outliers such as a user mechanical part data 116 that is not compatible with any part elements or that is compatible with very few part elements.

Still referring to FIG. 4, unsupervised machine-learning model 136 may include other unsupervised machine-learning models 416. This may include for example, neural networks, autoencoders, deep belief nets, Hebbian learning, adversarial networks, self-organizing maps, expectation-maximization algorithm, method of moments, blind signal separation techniques, principal component analysis, independent component analysis, non-negative matrix factorization, singular value decomposition (not pictured).

Figure 5:
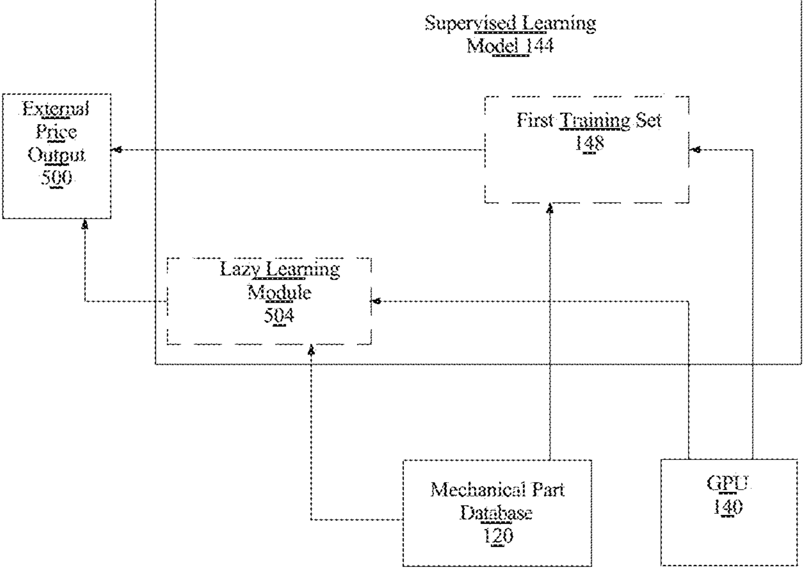
FIG. 5 illustrates a schematic representation illustrating an embodiment of a supervised machine-learning model.

Referring now to FIG. 5, an embodiment of supervised machine-learning model 144 is illustrated. Supervised machine-learning model 144 is configured to generate an external price output 500. External price output 500 is generated as a function of relating manufacturing request datum 108 to at least a part element. Supervised machine-learning model 144 generates the external price output 500 using first training set 148. Supervised machine-learning model 144 may be configured to perform any supervised machine-learning algorithm as described above in reference to FIG. 1. This may include for example, support vector machines, linear regression, logistic regression, naïve Bayes, linear discriminant analysis, decision trees, k-nearest neighbor algorithm, neural networks, and similarity learning. In an embodiment, first training set 148 may include the at least a correlated dataset. Supervised machine-learning model 144 may be further configured to calculate the external milling time as a function of relating the manufacturing request datum 108 to the material removal rate by each tool of the plurality of tools and to the area removal rate for each tool of the plurality of tools.

Continuing to refer to FIG. 5, supervised machine-learning model 144 may generate external price output 500 by executing a lazy learning module 504. Lazy learning module 504 is executed as a function of manufacturing request datum and the at least a part element. A lazy-learning process and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover a "first guess" at a mechanical part element associated with at least a manufacturing request datum, using at least a training set. As a non-limiting example, an initial heuristic may include an initial calculation of an external price output according to relation to a material data of at least a user mechanical part data, one or more categories of mechanical part data identified material data of at least a manufacturing request datum 108, and/or one or more values detected in at least a manufacturing request datum 108 sample; calculating may include, without limitation, calculating external milling time according to associations between elements of mechanical part data and compatible part elements. External milling time may be calculated using the following equation:

$$T^{MKT} = \frac{V_1}{MRR_1} + \frac{V_2}{MRR_2} + \frac{V_3}{MRR_3} + \dots \frac{V_n}{MRR_n} + \qquad \text{[EQ 01]}$$

-continued $$\frac{S_1}{ARR_1} + \frac{S_2}{ARR_2} + \frac{S_3}{ARR_3} + \dots \frac{S_n}{ARR_n}$$

where $T^{MKT}$ is the external milling time, $V_n$ is the volume removed by each tool of the plurality of tools, $MRR_n$ is the material removal rate of each tool of the plurality of tools, $S_n$ is the surface area removed by each tool of the plurality of tools, and $ARR_n$ is the area removal rate of each tool of the plurality of tools. Heuristic may include calculating external price output according to associations and/or compatible part elements. External price output may be calculated using the following equation:

$P^{MKT}$=($T^{MKT}$·<Mill Rate>+<Material cost>+<Labor cost>+<Overhead cost>+<Rework cost>+<Operating costs>)·<Mark up> [EQ 02]

where $P^{MKT}$ is the external price output, and $T_{MKT}$ is the external milling time as calculated above. Lazy learning module 504 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate external price outputs as described in this disclosure, including without limitation lazy learning applications of machine-learning algorithms as described in further detail below.

Figure 6:
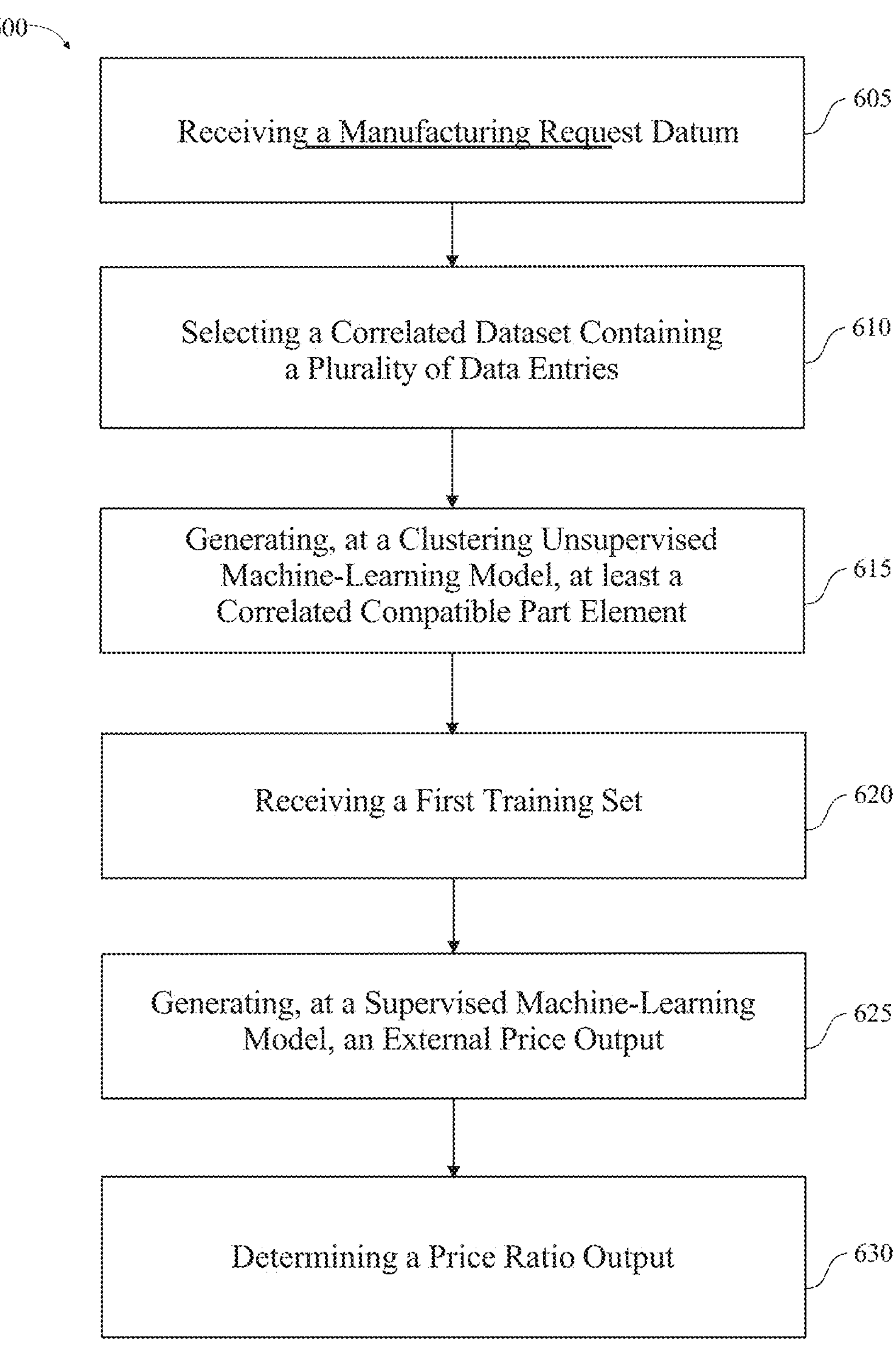
FIG. 6 illustrates a process flow diagram illustrating an embodiment of a method for predicting a price of any subtractively manufactured part utilizing artificial intelligence at a computer device.
Figure 7A:
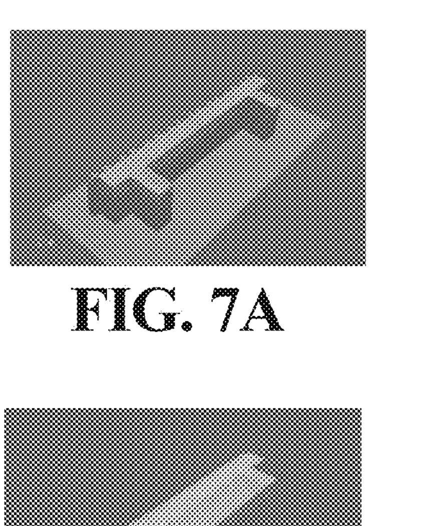
FIG. 7A-F illustrate computer renderings of an embodiment of the z-buffers for the surfaces of a mechanical part contained within manufacturing request datum.
Figure 7B:
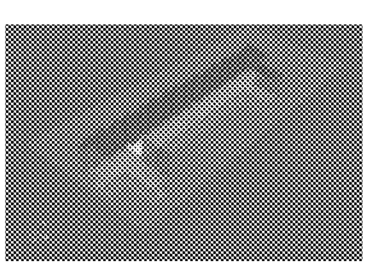
Figure 7C:
Figure 7D:
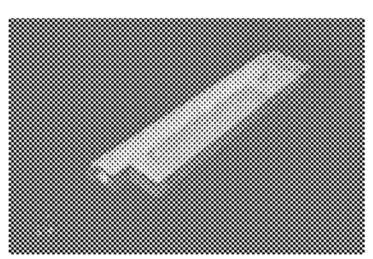
Figure 7E:
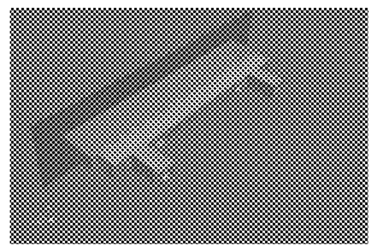
Figure 7F:
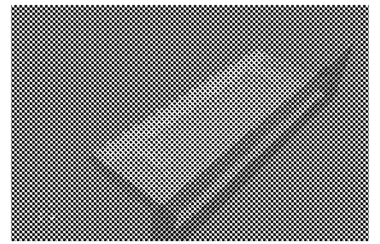
Figures 8A, 8B, 8C, 8D, 8E, 8F:
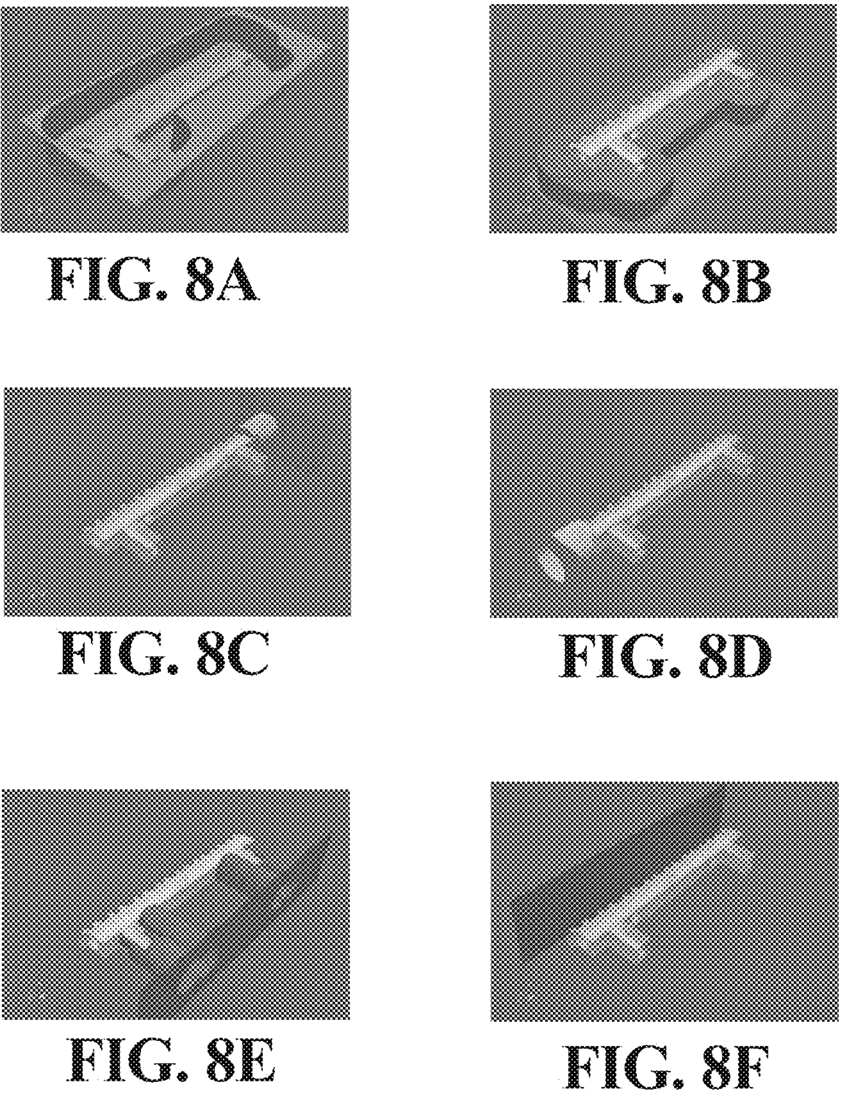
FIG. 8A-F illustrate computer renderings of an embodiment the machined surfaces of a part for manufacture contained within manufacturing request datum.

Referring now to FIG. 6, an embodiment of a method 600 for predicting a price of any CNC mechanical part utilizing artificial intelligence at a computing device is illustrated. At step 605 system 100 receives a manufacturing request datum 108 from a user client device 112. Manufacturing request datum 108 further comprises at least an element of user mechanical part data 116. Manufacturing request datum 108 may be received by system 100 utilizing any of the network methodology as described herein. Manufacturing request datum 108 may include any manufacturing request datum 108 as described herein. At least an element of user mechanical part data 116 may include any element of user mechanical part data 116 as described herein. For example and without limitation, at least an element of user mechanical part data 116 may include an element of part count data, such as a total quantity of parts for manufacture included within manufacturing request datum 108, as described above in further detail in reference to FIG. 1 As a further example and without limitation, at least an element of user mechanical part data 116 may include an element of part face count data, such as a total number of faces on the part for manufacture contained in the manufacturing request datum 108, as described in further detail above in reference to FIG. 1. As another non-limiting example, at least an element of user mechanical part data 116 may include an element of part material data, such as the material to which the part for manufacture included in manufacturing request datum 108 is to be manufactured, as described above in further detail in reference to FIG. 1.

Still referring to FIG. 6, at step 610 system 100 selects a correlated dataset containing a plurality of data entries. Each correlated dataset contains at least a datum of mechanical part data and at least a first correlated compatible part element as a function of the manufacturing request datum 108. Datasets may include any of the datasets as described herein. Datasets may be selected from mechanical part database 120. Datasets contained within mechanical part database 120 may be categorized and/or organized by any of the methodologies as described above in reference to FIG. 1 and FIG. 2. In an embodiment, at least a dataset may be selected by extracting at least a mechanical part data from manufacturing request datum 108 and matching the at least a mechanical part data to at least a correlated dataset containing at least an element of the at least a mechanical part data. At least a mechanical part data may be extracted from manufacturing request datum 108 utilizing language processing module 132 as described above in more detail in reference to FIG. 1. Mechanical part data may include any of the mechanical part data as described herein. For example, language processing module 132 may extract at least a mechanical part data such as a number of horizontal holed to be drilled in the part for manufacture contained within manufacturing datum 108 which may be utilized to match the number of horizontal holes to a dataset contained within mechanical part database 120 that contains the number of horizontal holes in the part for manufacture. In an embodiment, datasets contained within mechanical part database 120 may be organized and categorized according to mechanical part data. For example, mechanical part data relating to a mechanical part to be manufactured out of Poly(methyl methacrylate) (PMMA) extracted from manufacturing request datum 108 may be matched to a dataset contained within mechanical part database that is categorized as belonging to a category of mechanical part data such as thermoplastic mechanical parts. In yet another non-limiting example, a mechanical part relating to a flanged bolt included in manufacturing request datum 108 may be matched to a dataset contained within mechanical part database that is categorized as belonging to a category of mechanical parts such as threaded mechanical parts.

Still referring to FIG. 6, selecting a correlated dataset further comprises storing the manufacturing request datum 108 in internal database 128. At least an internal database, as described herein, includes any internal database 128, as described above in further detail in reference to FIG. 1 and FIG. 3. Datasets contained within internal database 128 may be categorized and/or organized by any of the methodologies as described above in reference to FIG. 1 and FIG. 3. Storing the manufacturing request datum 108 in internal database 128 may include any method and/or combination of methods of storing as described above in reference to FIGS. 1-5.

With continued reference to FIG. 6, at step 615 system 100 generates at least a first correlated compatible part element at clustering unsupervised machine-learning model 136. At least a first correlated compatible part element 400 is generated as a function of the manufacturing request datum 108 and the correlated dataset. Unsupervised machine-learning model 136 may include any of the unsupervised machine-learning models as described herein. Compatible part element may include any of the compatible part elements as described above in reference to FIGS. 1-5. Unsupervised machine-learning module 136 may generate other unsupervised learning models including for example anomaly detection model, data clustering model, and other unsupervised learning models. In an embodiment, datasets utilized to generate unsupervised learning models, including hierarchical clustering model 404, may be obtained from mechanical part database 120 as described above in more detail in reference to FIG. 2. In an embodiment, a plurality of datasets may be selected from mechanical part database 120 and utilized to generate clustering unsupervised machine-learning model 136 as described above in more detail in reference to FIG. 2. Datasets contained within mechanical part database 120 may be obtained from internal database 128 as described above in more detail in reference to FIGS. 1-3.

Continuing to refer to FIG. 6, system 100 includes a GPU 140 designed and configured to calculate the volume removed by each tool of the plurality of tools for the at least a correlated compatible part element 400. The at least a compatible part element 400 is calculated as a function of the internal database 128. The GPU 140 includes any GPU 140 as described above in further detail in reference to FIG. 1. The volume removed may be calculated using a machining simulation for each tool of the plurality of tool for the compatible part element 400. The machining simulation, as described herein, may include, GPU 140 simultaneous rasterizing and z-buffering each side of the plurality of sides of the mechanical part for manufacture.

With continued reference to FIG. 6, GPU 140 is further designed and configured to calculate the material removal rate of each tool of the plurality of tools for the at least a correlated compatible part element 400. Compatible part element 400 is calculated as a function of the internal database 128. The internal database 128 includes any internal database 128 as described herein. The material removal rate may be calculated using the following function:

MRR=<Depth of Cut>·<Width of Cut>·<Feed Rate> [EQ 03]

where MRR is the material removal rate of each tool of the plurality of tools for the at least a correlated compatible part element 400.

Continuing to refer to FIG. 6, GPU 140 is further designed and configured to calculate the surface area finished by each tool of the plurality of tools for the at least a correlated compatible part element 400. The at least a compatible part element 400 is calculated as a function of the internal database 128. The internal database 128 may include any internal database 128 as described herein. The surface area finished may be calculated using a machining simulation for each tool of the plurality of tool for the compatible part element 400. The machining simulation may include any machining simulation as described above.

With continued reference to FIG. 6, GPU 140 is further designed and configured to calculate the area removal rate of each tool of the plurality of tools for the at least a correlated compatible part element 400. Compatible part element 400 is calculated as a function of the internal database 128. The internal database 128 includes any internal database 128 as described herein. The area removal rate of the side wall may be calculated using the following function:

ARR=<Depth of Cut>·<Feed Rate> [EQ 04]

where ARR is the area removal rate of the side wall of each tool of the plurality of tools for the at least a correlated compatible part element 400. The side wall, as described herein, includes a surface forming a wall, such as a vertical surface. The area removal rate of the horizontal plane is calculated using the following equation:

ARR=<Width of Cut>·<Feed Rate> [EQ 05]

where ARR is the area removal rate of the horizontal plane of each tool of the plurality of tools for the at least a correlated compatible part element 400. The horizontal plane, as described herein, includes a surface horizontally passing through the part for manufacture. The area removal rate of inclined and curved surfaces is calculated using the following equation:

ARR=<Stepover>·<Feed Rate> [EQ 06]

where ARR is the area removal rate of the includes or curved surface of each tool of the plurality of tools for the at least a correlated compatible part element 400 and stepover is determined by scallop height, which is the surface roughness requirement.

Continuing to refer to FIG. 6, at step 620 system 100 receives a first training set 148. The first training set 148 is received as a function of the at least an element of user mechanical part data 116 and the at least a correlated compatible part element 400. Training set may include any of the training sets and training data as described above in reference to FIGS. 1-5. In an embodiment, first training set 148 may include the correlated dataset to be utilized as first training set 148. Correlated datasets may include as correlated dataset and/or correlated data table as described above in detail in reference to FIGS. 1-5. First training set 148 may be received by categorizing manufacturing request datum 108 to contain part element and selecting at least a first training set 148 as a function of the at least a part element. User mechanical part data 116 may include any user mechanical part data 116 as described above in further detail in reference to FIG. 1. For example, user mechanical part data may indicate a number of faces of a mechanical part for manufacture included in manufacturing request datum 108.

Still referring to FIG. 6, at step 625 system 100 generates an external price output 500 at a supervised machine-learning model 144. External price output 500 is generated as a function of relating the manufacturing request datum 108 to the at least a part element. Supervised machine-learning model 144 may include any of the supervised machine-learning model 144 as described above in reference to FIGS. 1-5. External price output may include an external price output as described above in reference to FIG. 5. The external price output 500 may be generated by the equation as described above in further detail in reference to FIG. 5.

With continued reference to FIG. 6, generating an external price output 500 at a supervised machine-learning model 144 further comprises calculating the external milling time. The external milling time is calculated as a function of relating the manufacturing request datum 108 to the material removal rate by each tool of the plurality of tools and to the area removal rate for each tool of the plurality of tools. The external milling time is calculated using the equation as described above in reference to FIG. 5.

Still referring to FIG. 6, at step 630 system 100 determines a price ratio output 152. Determining a price ratio output 152 further comprises generating a loss function of a part specific variable and minimizing the loss function. The price ratio is the internal cost to fulfill the manufacturing request datum 108 divided by the external price output, as described above in further detail in reference to FIG. 1. Loss function may include any of the loss functions as described above in reference to FIGS. 1-5. Generating a loss function may include generating a loss function utilizing any of the methodologies as described above in reference to FIGS. 1-5. A part specific variable includes any part specific variable as described above in further detail in reference to FIG. 1. For example, system 100 may generate a loss function utilizing part specific variables that include any features, limitations, details, restrictions and/or specifications relating to the CNC mechanical part geometry, materials, finishes, connections, hardware, special processes, dimensions, tolerances, and the like. Minimizing a loss function may be done utilizing any of the methodologies as described above in reference to FIGS. 1-15. Loss function analysis algorithms may iterate to gradually converge towards a minimum where further tweaks to the parameters produce little or zero changes in the loss or convergence by optimizing weights utilized by machine-learning algorithms.

Referring now to FIGS. 7A-F, an embodiment of the first stage of machining simulation at GPU 140 is illustrated. The first stage of machining simulation, as described above in reference to FIG. 6, includes GPU 140 simultaneously rasterizing and z-buffers each side of the plurality of sides of the part for manufacture included in the manufacturing request datum 108. FIGS. 7A-F displays the 3D rendering of the z-buffers for a mechanical part contained within manufacturing request datum 108 with six sides. Each side of the six sides are displayed in each figure of FIGS. 7A-F.

Referring now to FIGS. 8A-F, an embodiment of the second stage of machining simulation at GPU 140 is illustrated. The second stage of machining simulation, as described above in reference to FIG. 6, includes GPU 140 simulating the machining of each surface of the plurality of surfaces for the mechanical part for manufacture using each tool of the plurality of tools necessary to machine the part for manufacture contained within manufacturing request datum 108. FIGS. 8A-F displays the 3D rendering of each simulated machined surface of the plurality of machined surfaces for a part for manufacture contained within manufacturing request datum 108 with six sides. Each side of the six sides are displayed in each figure of FIGS. 8A-F.

Figure 9:
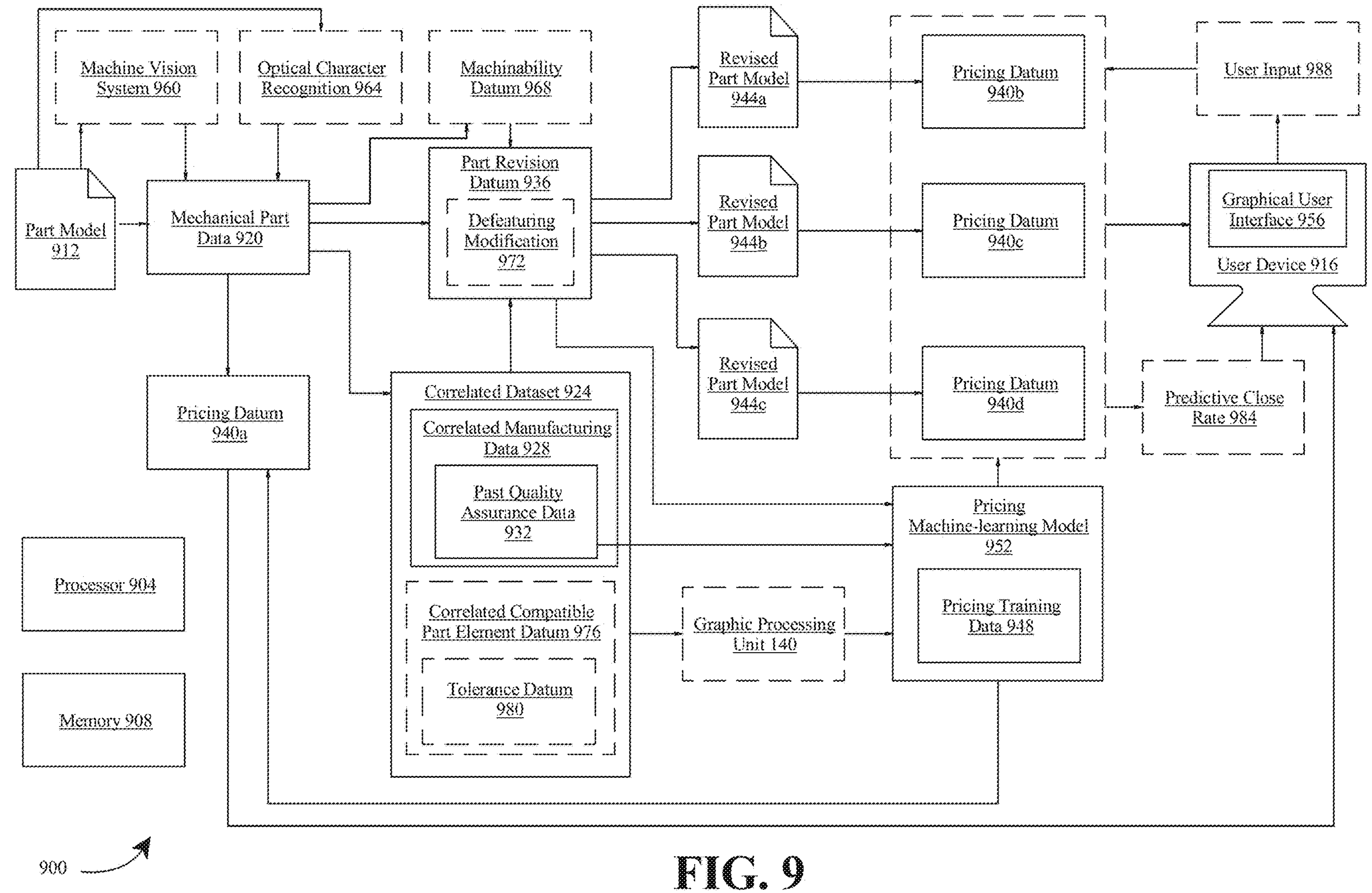
FIG. 9 illustrates an exemplary system for making prediction associated with any subtractively manufactured part using artificial intelligence.

Referring now to FIG. 9, a flow diagram of an exemplary system 900 for making prediction associated with any subtractively manufactured part using artificial intelligence is illustrated. Processor 904 may be designed and/or configured to perform any method, method step, or sequence of method steps in any embodiment described in this disclosure, in any order and with any degree of repetition. For instance, processor 904 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 904 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 9, for the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 9, in some embodiments, system 900 can include part model 912, user device 916, mechanical part data 920, correlated dataset 924, correlated manufacturing data 928, past quality assurance data 932, part revision datum 936, pricing datum 940*a-d*, revised part model 944*a-c*, pricing training data 948, pricing machine-learning model 952, graphical user interface 956, machine vision system 960, optical character recognition 964, machinability datum 968, defeaturing modification 972, correlated compatible part element datum 976, tolerance datum 980, graphical processing unit 140, predictive close rate 984, user input 988, and the like.

With continued reference to FIG. 9, memory 908 contains instructions configuring processor 904 to receive part model 912. "Part model," as used herein, is a digital representation of a "part to be manufactured," which is a specific part that is intended to be produced using one or more manufacturing processes as described herein. In some cases, a part may be manufactured from various materials, including, for example and without limitation, aluminum, steel, titanium, metal alloys, brass, and the like; plastics, such as nylon, acrylic, Delrin, polycarbonate, and the like; foam, composites, wood, or other substances. In some cases, a part may have one or more specific functions or role within the assembled item. In some cases, a part may be manufactured using various manufacturing techniques as described herein, such as, without limitation, subtractive manufacturing, additive manufacturing, injection molding, and the like. In some embodiments, part model 912 may include semantic information; such as dimensions, materials, tolerances, geometric characteristics, and the like.

With continued reference to FIG. 9, in some embodiments, part model 912 may include a computer-aided design (CAD) model. As a non-limiting example, CAD model may include SolidWorks, AutoCAD, CATIA, and/or any other applicable design software. In a non-limiting example, CAD or computer-aided manufacturing (CAM) file may include various formats such as DWG, DXF, STP, STL, PDF, IFC, or other proprietary formats depending on the CAD or CAM software used. In some embodiments, part model 912 may include a hand-drawn drawings of a part. In a non-limiting example, part model 912 may be in a format of image, document, digital file, print, and the like. For example, and without limitation, part model 912 may include portable document format (PDF). In some embodiments, part model 912 may include a three-dimensional (3D) part model. A "three-dimensional part model," as described herein, is a representative model of a part to be manufactured designed in three dimensions. In some embodiments, part model 912 may include a two-dimensional part model. As used in this disclosure, "two-dimensional part model" is a representative model of a part designed in two dimensions.

With continued reference to FIG. 9, in some embodiments, processor 904 may receive part model 912 from a user device 916. For the purposes of this disclosure, a "user device" is an external device to a processor 904. As a non-limiting example, user device 916 may include a smartphone, tablet, laptop, or the like. In some embodiments, user device 916 may include an interface configured to receive inputs from a user. In some embodiments, a user may manually input any data into system 100 using user device 916. In some embodiments, a user may have a capability to process, store or transmit any information independently. For the purposes of this disclosure, a "user" is any individual, entity, or organization that uses a system 100. As a non-limiting example, a user may include an engineer, product designer, manufacturer, client, and the like. Part model 912 may be received through user input 988, such and without limitations, by a user input 988 ting or uploading part model 912 into processor 904. The user device 916 described herein may be consistent with user client device 112 described above.

With continued reference to FIG. 9, memory 908 contains instructions configuring processor 904 to identify at least an element of mechanical part data 920 as a function of part model 912 and extract at least an identified element of mechanical part data 920. For the purposes of this disclosure, "mechanical part data" is data related to characteristic features and structural features recognized in a part model. For example, and without limitation, mechanical part data 920 may include dimensions, geometric characteristics, coordinates or axes in part model 912 in the coordinate system, characters that must be subtractively manufactured on a part, merging lines, edges, engravings, letters, corners, and the like.

With continued reference to FIG. 9, in some cases, processor 904 may be configured to analyze hand-drawn drawings using an optical character recognition 964 (OCR 964) to obtain mechanical part data 920. For the purposes of this disclosure, "optical character recognition" is a technology that enables the recognition and conversion of printed or written text into machine-encoded text. In some cases, processor 904 may be configured to recognize a keyword using the OCR 964 to find mechanical part data 920. As used in this disclosure, a "keyword" is an element of word or syntax used to identify and/or match elements to each other. In some cases, processor 904 may transcribe much or even substantially all part models 912.

With continued reference to FIG. 9, in some embodiments, optical character recognition 964 or optical character reader may include automatic conversion of images of written (e.g., typed, handwritten or printed text) into machine-encoded text. In some cases, recognition of a keyword (mechanical part data 920) from part model 912 may include one or more processes, including without limitation optical character recognition 964 (OCR 964), optical word recognition, intelligent character recognition, intelligent word recognition, and the like. In some cases, OCR 964 may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 9, in some cases, OCR 964 may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 9, in some cases, OCR 964 processes may employ pre-processing of part model. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to part model to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR 964 algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR 964 algorithm to be selected. In some cases, a character isolation or "segmentation" process may separate signal characters, for example character-based OCR 964 algorithms. In some cases, a normalization process may normalize aspect ratio and/or scale of image component.

With continued reference to FIG. 9, in some embodiments an OCR 964 process may include an OCR 964 algorithm. Exemplary OCR 964 algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 9, in some embodiments, an OCR 964 process may include a feature extraction process. In some cases, feature extraction may decompose a glyph into a feature (e.g., mechanical part data 920). Exemplary non-limiting features (e.g., mechanical part data 920) may include corners, edges, lines, closed loops, line direction, line intersections, and the like. In some cases, feature extraction may reduce dimensionality of representation and may make the recognition process computationally more efficient. In some cases, extracted features may be compared with an abstract vector-like representation of a character, which might reduce to one or more glyph prototypes. General techniques of feature detection in computer vision are applicable to this type of OCR 964. In some embodiments, machine-learning processes like nearest neighbor classifiers (e.g., k-nearest neighbors algorithm) may be used to compare image features with stored glyph features and choose a nearest match. OCR 964 may employ any machine-learning process described in this disclosure, for example machine-learning processes described with reference to FIG. 5. Exemplary non-limiting OCR 964 software may include Cuneiform and Tesseract. Cuneiform may include a multi-language, open-source optical character recognition 964 system originally developed by Cognitive Technologies of Moscow, Russia. Tesseract may include free OCR 964 software originally developed by Hewlett-Packard of Palo Alto, California, United States.

With continued reference to FIG. 9, in some cases, OCR 964 may employ a two-pass approach to character recognition. A first pass may try to recognize a character. Each character that is satisfactory may be passed to an adaptive classifier as training data. The adaptive classifier then may get a chance to recognize characters more accurately as it further analyzes part model. Since the adaptive classifier may have learned something useful a little too late to recognize characters on the first pass, a second pass may be run over part model. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR 964 software tool may include OCR 964 opus. OCR 964 opus development is led by German Research Centre for Artificial Intelligence in Kaiserslautern, Germany. In some cases, OCR 964 software may employ neural networks.

With continued reference to FIG. 9, in some cases, OCR 964 may include post-processing. For example, OCR 964 accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR 964 process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR 964 process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR 964 post-processing to further optimize results.

With continued reference to FIG. 9, in some embodiments, identifying and extracting mechanical part data 920 may include identifying and extracting mechanical part data 920 using machine vision system 960. In some embodiments, processor may be configured to analyze part model 912 (e.g., 3D part model, 2D part model, CAD model, hand drawn model, and the like). using machine vision system 960 to determine mechanical part data 920. For the purposes of this disclosure, a "machine vision system" is a type of technology that enables a computing device to inspect, evaluate and identify still or moving images. For example, in some cases a machine vision system 960 may be used for world modeling or registration of objects within a space. In some cases, registration may include image processing, such as without limitation object recognition, feature detection, edge/corner detection, and the like. Non-limiting examples of feature detection may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, and the like. In some cases, a machine vision process may perform eye tracking (i.e., gaze estimation). In some cases, a machine vision process may perform person detection, for example by way of a trained machine-learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

With continued reference to FIG. 9, in some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an x-y plane of a first frame; a result, x and y translational components and ø may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

With continued reference to FIG. 9, alternatively or additionally, identifying and extracting mechanical part data 920 may include classifying the mechanical part data 920 to a label of mechanical part data 920 using an image classifier; the image classifier may be trained using a plurality of mechanical part data 920. The image classifier may be configured to determine which of a plurality of edge-detected shapes is closest to an attribute set of mechanical part data 920 as determined by image classifier trained using training data and selecting the determined as mechanical part data 920 or label of mechanical part data 920. As a non-limiting example, the image classifier may be trained with image training data that correlates the plurality of images of mechanical part data 920 to a label of mechanical part data 920. For example and without limitation, the image training data may correlate a plurality of images of engravings to a label of 'engraving.' The image classifier and the image training data disclosed herein are described further below. Alternatively, identification of mechanical part data 920 may be performed without using computer vision and/or classification; for instance, identifying mechanical part data 920 may further include receiving, from a user, an identification of mechanical part data 920 in part model 912.

With continued reference to FIG. 9, in some cases, a machine vision system 960 may use a classifier, such as any classifier described throughout this disclosure. As a non-limiting example, the machine vision system 960 may use an image classifier. For example and without limitation, the machine vision system 960 may use the image classifier, wherein an input may include part model 912 that is analyzed to find mechanical part data 920, and through a classification algorithm, outputs mechanical part data 920 with a label of mechanical part data 920 based on image training data. For the purposes of this disclosure, "image training data" is training data that is used to train an image classifier. The image training data disclosed herein may be consistent with any training data disclosed in the entirety of this disclosure. In an embodiment, the image training data may correlate part model 912 that may be analyzed to find mechanical part data 920 to mechanical part data 920 with a label of mechanical part data 920.

With continued reference to FIG. 9, processor 904 may be configured to determine a machinability datum 968 as a function of mechanical part data 920. A "machinability datum," as used herein, is an element of data describing whether a part to be manufactured can be manufactured based on available equipment. "Machinability" as used in the current disclosure is the case with which a material or part may be machined. In an embodiment, machinability datum 968 may be evaluation of if the part model 912 can be consistently manufactured to a given standard. In a non-limiting example, a machinability datum 968 may be a Boolean value, a score, or a single datum value for the part for manufacture. In an embodiment, machinability datum 968 includes a machining process. In embodiments, machinability datum 968 may include subsequent processes after machining such as grinding, polishing, anodizing, plating and painting. Additionally, machinability datum 968 may be a list of geometric features depicted in the model, each of which receives a machinability datum 968. As used herein, "grinding" is a process of removing materials, such as unwanted materials, from a workpiece. As used herein, "anodizing" is a process of creating a protective oxide layer on the surface of a metal part, such as aluminum or titanium parts. As used in this disclosure, "plating" is the process of applying a thin layer of metal onto a part or substrate. Machinability datum 968 could be a vector or table of values linked to and/or corresponding to features. Machinability datum 968 may be based on a consideration of the level of difficulty it would take to machine the given part and keep all its features within the given tolerance range. Machinability datum 968 may also be a consideration of the amount of force it would take to machine the parts without causing deflection of the part in the fixturing system. Both deflection of tool and part may deteriorate accuracy of the part and result in failure of fulfilling the specification. In other embodiments, machinability datum 968 may encompass a consideration if a part can be machined as a function of a set of tools that are required to complete. In some embodiments, the user may be presented with an option for in-house or outsourced manufacturing as well as other processes such as grinding and polishing to fulfill surface finish and surface tolerance requirements. In a further embodiment, machinability datum 968 may be determined based on whether manufacturing is in-house or outsourced. In a nonlimiting example, anodizing process may be performed in-house, which may indicate an easier machinability than if process needed to be outsourced.

With continued reference to FIG. 9, machinability datum 968 may encompass two sets of factors: the condition of work materials and the physical properties of work materials. As used in the current disclosure, "work materials" are raw or stock materials that the part is machined out of. Stock materials may include fabricates materials such as materials fabricated in accordance with industrial standards such as the American Society for Testing and Materials (ASTM) and the International Organization for Standardization (ISO). In a nonlimiting example, stock material may include an aluminum alloy fabricated in accordance with the ASTM B209 standard, which is widely used in aerospace and automotive manufacturing. The condition of the work material is determined by eight factors: microstructure, grain size, heat treatment, chemical composition, fabrication, hardness, yield strength, and tensile strength, Physical properties are those of the individual material groups, such as the modulus of elasticity, thermal conductivity, thermal expansion, work hardening, yield strength, tensile strength and density. Machinability datum 968 may be based on operating conditions, cutting tool material and geometry, and the machining process parameters.

With continued reference to FIG. 9, processor 904 may determine machinability datum 968 from part model 912 using several methods. Processor 904 may be configured to decide which method to use as a function for the work materials and the configuration of the part that is being created. Methods of determining machinability datum 968 may include several methods such as the tool life method, tool forces and power consumption method, surface finish method, the Taylor tool life equation, and the machinability rating method. A person of ordinary skill in the art would know that there is no widely accepted consensus method of determining machinability. With that in mind, accurately determining the machinability of different parts and materials may require any method or combination of methods mentioned herein above. Machinability datum 968 may include machinability datum 968 as described in U.S. patent application Ser. No. 17/693,770, filed Mar. 14, 2022, titled "METHOD AND APPARATUS FOR AN INTERACTIVE COMPLIANT MANUFACTURING PROCESS," which is incorporated by reference herein in its entirety.

With continued reference to FIG. 9, processor 904 may be configured to identify an unmanufacturable feature of a part to be manufactured as a function of mechanical part data 920. An "unmanufacturable feature," as used herein, is a feature that cannot be manufactured using tools available. As used herein, "tools available" include manufacturing, grinding, polishing, anodizing, plating and painting tools. In some embodiments, unmanufacturable features may be identified as a function of mechanical part data 920. In some embodiments, unmanufacturable features may be identified by comparing tolerance of a feature to a range of tolerances. In a nonlimiting example, processor 904 may identify unmanufacturable features by identifying that feature tolerance does not fall within a set range of tolerance for that feature. In a non-limiting example, qualities that make unmanufacturable feature may include workpiece material deteriorations, tolerances, geometric features for the part to be manufactured, surface roughness, time, cost, a set of tools, fixturing system, tool accessibility, set-up and load time for the part to be manufactured, machinability datum 968, manufacturability, and the like. If the given quality for a part is outside a predetermined range for any of these considerations the part may be considered unmachinable. In some embodiments, identifying an unmanufacturable feature may include comparing machinability datum 968 for a feature and/or part to a machinability threshold. If, as a non-limiting example, machinability datum 968 exceeds a machinability threshold, a feature and/or part may be deemed to be an unmanufacturable part and/or unmanufacturable feature and/or unacceptably high risk of reject rate upon the fabrication. Or these features may be deemed alternative to more expensive processes such as EDM (Electrical discharge machining) and polishing.

With continue reference to FIG. 9, memory 908 contains instructions configuring processor 904 to select a correlated dataset 924 including a plurality of data entries as a function of extracted element of mechanical part data 920, wherein each data entry includes a plurality of correlated manufacturing data 928, and wherein the plurality of correlated manufacturing data 928 further includes at least a requirement fulfillment record from past quality assurance data 932. The correlated dataset 924 is further described above. For the purposes of this disclosure, "correlated manufacturing data" is information of the manufacturing process of a part to be manufactured. In some embodiments, correlated manufacturing data 928 may be tied to specific manufacturing process and geometric designed and tolerance (GD&T). As a non-limiting example, correlated manufacturing data 928 may include 3-axis motion, 5-axis motion, types of engraving process, types of milling process, and the like. For example, and without limitation, correlated manufacturing data 928 may include different types of engraving process' such as punch stamp, electrical discharge machining (EDM), laser engraving, computer numerical control (CNC) engraving, chemical etching, gear milling hobbling, 5-axis machining, special tool CNC process such as slotting with T-slot cutter, various types of cams (side-actions) in injection molding, and the like. As another non-limiting example, correlated manufacturing data 928 may include casting and molding, which involves pouring a liquid material into a mold where it solidifies into the desired shape. As another non-limiting example, correlated manufacturing data 928 may include forming, which includes techniques like forging, rolling, and stamping. As another non-limiting example, correlated manufacturing data 928 may include machining, involving the removal of material from a workpiece to achieve precise dimensions and shapes. As another non-limiting example, correlated manufacturing data 928 may include joining processes, such as welding, soldering, and adhesive bonding, are used to assemble multiple parts into a single unit. As another non-limiting example, correlated manufacturing data 928 may include additive manufacturing that builds objects layer by layer from materials like plastic or metal, allowing for the creation of complex geometries that would be difficult or impossible to achieve with traditional methods. As another non-limiting example, correlated manufacturing data 928 may include finishing processes to enhance the appearance and properties of the final product. In a non-limiting example, as example of detected letters (e.g., mechanical part data 920) on parts (e.g., part model 912), optimum manufacturing processes may differ based on the quantities, the precision, the depth and the cost. In some embodiments, correlated manufacturing data 928 may include capability of suppliers to manufacture a part to meet tolerance. In some embodiments, manufacturing processes (e.g., correlated manufacturing data 928) may be mapped to the ability or equipment of suppliers. In some embodiments, the user may manually input correlated manufacturing data 928. In some embodiments, processor 904 may retrieve correlated manufacturing data 928 from a database.

With continued reference to FIG. 9, for the purposes of this disclosure, "past quality assurance data" is historical data collected from previous quality assurance activities. As a non-limiting example, past quality assurance data may include information from inspections, tests, audits, and reviews that were conducted to verify that a party met the required standards. "Quality assurance" is a process of systematically monitoring and evaluating various aspects of a part to ensure that the standards of quality are being met. It may involve checking for defects, ensuring consistency, and confirming that the product or process complies with the required specifications. For the purposes of this disclosure, "requirement fulfillment record" is specific standards, criteria, or conditions that a part must meet. These could be related to dimensions, material properties, performance characteristics, safety standards, or regulatory compliance. In some embodiments, the user may manually input past quality assurance data 932. In some embodiments, processor 904 may retrieve past quality assurance data 932 from a database.

With continued reference to FIG. 9, in some embodiments, processor 904 may be configured to generate manufacturing training data. In a non-limiting example, manufacturing training data may include correlations between exemplary dataset or exemplary mechanical part data correlated to exemplary manufacturing part data. In some embodiments, manufacturing training data may be stored in a database. In some embodiments, manufacturing training data may be received from one or more users, database, external computing devices, and/or previous iterations of processing. As a non-limiting example, manufacturing training data may include instructions from a user, who may be an expert user, a past user in embodiments disclosed herein, or the like, which may be stored in memory and/or stored in database, where the instructions may include labeling of training examples. The database may be any database described in this disclosure. In some embodiments, manufacturing training data may be updated iteratively on a feedback loop. As a non-limiting example, processor 904 may update manufacturing training data iteratively through a feedback loop as a function of mechanical part data 920, or the like. In some embodiments, processor 904 may be configured to generate manufacturing machine-learning model. In a non-limiting example, generating manufacturing machine-learning model may include training, retraining, or fine-tuning manufacturing machine-learning model using manufacturing training data or updated manufacturing training data. In some embodiments, processor 904 may be configured to correlated dataset 924 or correlated manufacturing data 928 using manufacturing machine-learning model (i.e. trained or updated manufacturing machine-learning model). In some embodiments, generating training data and training machine-learning models may be simultaneous.

Figure 10:
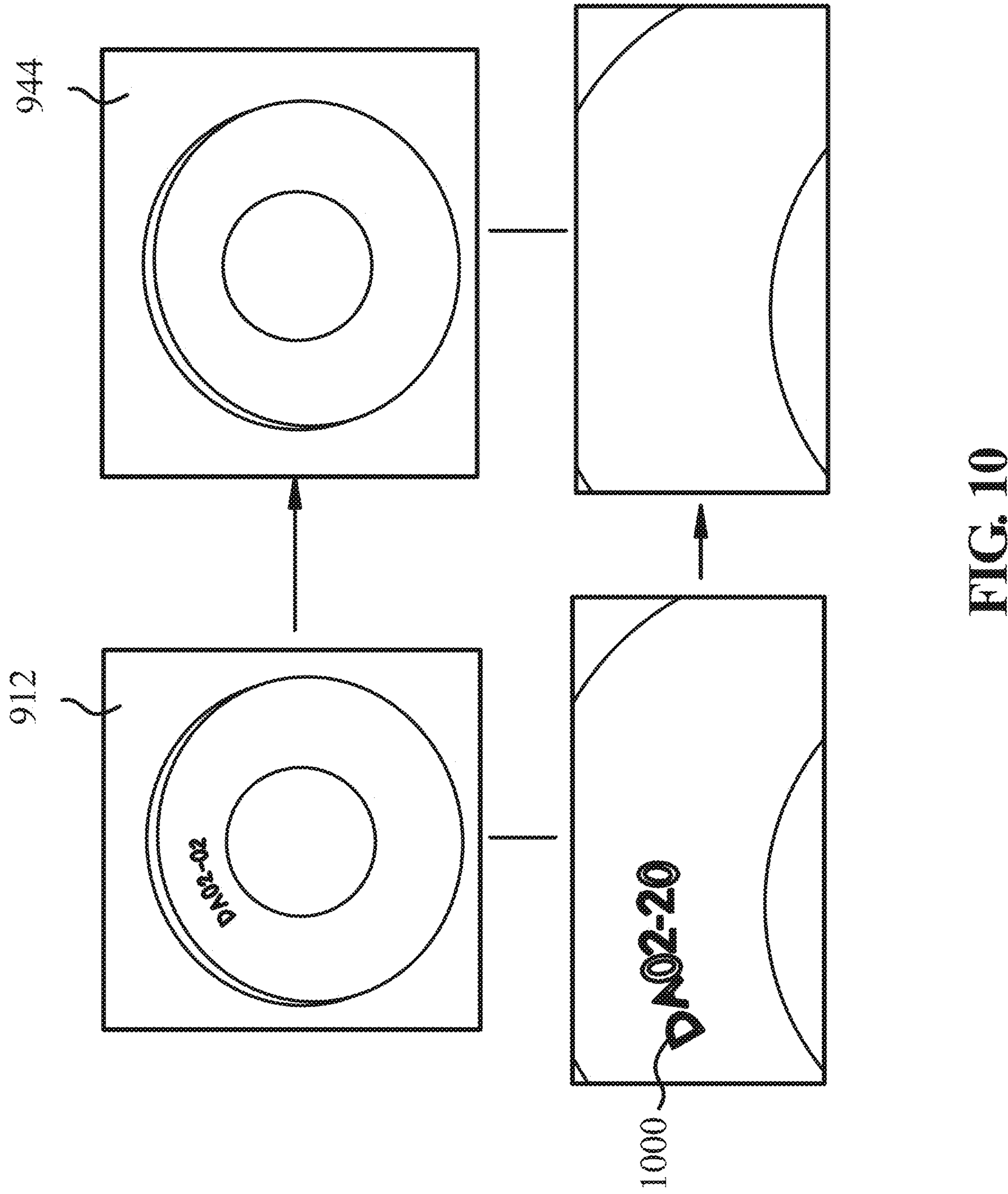
FIG. 10 illustrates an exemplary part model with exemplary mechanical part data and exemplary revised defeatured part model.
Figure 11:
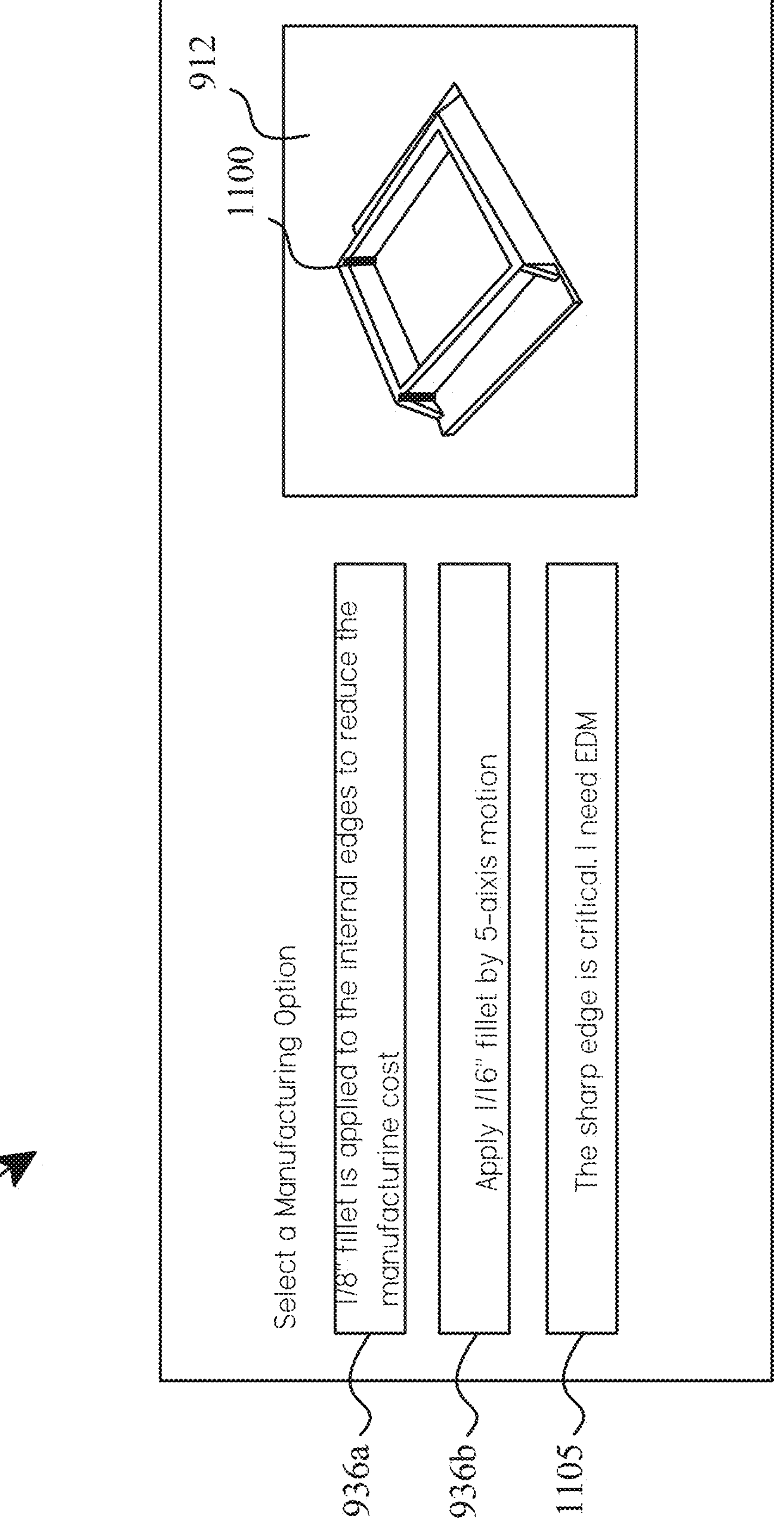
FIG. 11 illustrates an exemplary graphical user interface displaying a part model and a plurality of part revision data.

With continue reference to FIG. 9, memory 908 contains instructions configuring processor 904 to generate at least a part revision datum 936 for a plurality of correlated manufacturing data 928. For the purposes of this disclosure, a "part revision datum" is a data element related to revising a design of a part model. In some embodiments, part revision datum 936 may be compliant to specific manufacturing processes on each feature (e.g., mechanical part data 920). As a non-limiting example, part revision datum 936 may include changing types of manufacturing process, revising a design of part model 912, revising characteristics or features (e.g., mechanical part data 920) of part model 912, and the like. For example, and without limitation, part revision datum 936 may include changing 5-axis motion of manufacturing process to 3-axis motion manufacturing process. For example, and without limitation, part revision datum 936 may include applying 1/16" fillet instead of 1/8" fillet. In some embodiments, at least a part revision datum 936 may include a defeaturing modification 972. Exemplary defeaturing modification 972 is illustrated in FIG. 10. For the purposes of this disclosure, a "defeaturing modification" is a modification of a design to remove an identified feature in a part model. In a non-limiting example, as example of lettering (e.g., mechanical part data 920) in a part model 912 for engraving may be determined to be removed (e.g., defeaturing modification 972) to reduce pricing datum 940*a* to pricing datum 940*b*. In some embodiments, processor 904 may generate part revision datum 936 and revise part model 912 according to part revision datum 936, generating revised part model 944*a-c*. For the purposes of this disclosure, a "revised part model" is a part model that is revised according to a part revision datum. In some embodiments, processer 904 may generate a plurality of revised part models 944*a-c*, each has a part model 912 revised according to different part revision datum 936.

With continue reference to FIG. 9, in some embodiments, processor 904 may determine part revision datum 936 as a function of pricing datum 940*a*. In a non-limiting example, processor 904 may determine part revision datum 936 to reduce pricing datum 940*a* for a part model 912 when performing correlated manufacturing data 928. Determining pricing datum 940*a* is further described below. In a non-limiting example, processor 904 may generate part revision datum 936 that meets requirement fulfillment record from past quality assurance data 932. In some embodiments, generating at least a part revision datum 936 may include determining a machinability datum 968 as a function of at least an extracted element of mechanical part data 920 and generating at least a part revision datum 936 as a function of the machinability datum 968. As a non-limiting example, processor 904 may determine part revision datum 936 to increase machinability of part model 912. For example, and without limitation, part revision datum 936 may include changing the design of part model 912 to include 3-axis motion manufacturing process instead of 5-axis motion of manufacturing process as a supplier may not have a capability for 5-axis motion. In some embodiments, user may manually input part revision datum 936. In some embodiments, processor 904 may retrieve part revision datum 936 from a database.

With continued reference to FIG. 9, in some embodiments, processor 904 may be configured to generate revision training data. In a non-limiting example, revision training data may include correlations between exemplary correlated manufacturing data, exemplary mechanical part data, exemplary machinability data, exemplary pricing data, and/or the like correlated to exemplary part revision data. In some embodiments, revision training data may be stored in a database. In some embodiments, revision training data may be received from one or more users, database, external computing devices, and/or previous iterations of processing. As a non-limiting example, revision training data may include instructions from a user, who may be an expert user, a past user in embodiments disclosed herein, or the like, which may be stored in memory and/or stored in database, where the instructions may include labeling of training examples. The database may be any database described in this disclosure. In some embodiments, revision training data may be updated iteratively on a feedback loop. As a non-limiting example, processor 904 may update revision training data iteratively through a feedback loop as a function of mechanical part data 920, correlated manufacturing data 928, or the like. In some embodiments, processor 904 may be configured to generate revision machine-learning model. In a non-limiting example, generating revision machine-learning model may include training, retraining, or fine-tuning revision machine-learning model using revision training data or updated revision training data. In some embodiments, processor 904 may be configured to part revision datum 936 using revision machine-learning model (i.e. trained or updated revision machine-learning model). In some embodiments, generating training data and training machine-learning models may be simultaneous.

With continued reference to FIG. 9, memory 908 contains instructions configuring processor 904 to determine a pricing datum 940*b-d* as a function of extracted element of mechanical part data 920 and correlated manufacturing data 928. For the purposes of this disclosure, a "pricing datum" is a data element related to pricing of manufacturing of a part to be manufactured of a part model. As a non-limiting example, pricing datum 940 may include an estimated amount of cost to manufacture a part according to part model 912. In a non-limiting example, processor 904 may determine pricing datum 940*a* as a function of mechanical part data 920; for instance, pricing datum 940*a* may be a standard cost to manufacture a part that has features (e.g., mechanical part data 920). In another non-limiting example, processor 904 may determine pricing datum 940*b-d* as a function of part revision datum 936; for instance, pricing datum 940*a* may be a cost to manufacture a part according to revised design of part model 912 (e.g., revised part model 944*a-c*). For example, and without limitation, pricing datum 940*b-d* may have lower cost than pricing datum 940*a*. In some embodiments, user may manually input pricing datum 940*a*-

*d*. In some embodiments, processor 904 may retrieve pricing datum 940*a-d* from a database.

With continued reference to FIG. 9, determining pricing datum 940 includes generating pricing training data 948. For the purposes of this disclosure, "pricing training data" is a data that correlates part revision data pricing datums. Pricing training data 948 includes exemplary part revision data correlated to exemplary pricing data. In some embodiments, pricing training data 948 may include exemplary part revision data and exemplary manufacturing request data correlated to exemplary pricing data. Determining pricing datum 940 includes training, iteratively, a pricing machine-learning model 952 using the pricing training data 948 and generating the pricing datum 940 as a function of the pricing machine-learning model 952. For the purposes of this disclosure, a "pricing machine-learning model" is a machine-learning model that determines a pricing datum. In a non-limiting example, pricing training data 948 may include exemplary part revision data correlated to exemplary pricing data. In some embodiments, pricing training data 948 may be stored in database. In some embodiments, pricing training data 948 may be received from one or more users, database, external computing devices, and/or previous iterations of processing. As a non-limiting example, pricing training data 948 may include instructions from a user, who may be an expert user, a past user in embodiments disclosed herein, or the like, which may be stored in memory and/or stored in database, where the instructions may include labeling of training examples. The database may be any database described in this disclosure. In some embodiments, pricing training data 948 may be updated iteratively on a feedback loop. As a non-limiting example, processor 904 may update pricing training data 948 iteratively through a feedback loop as a function of mechanical part data 920, correlated manufacturing data 928, past quality assurance data 932, part revision datum 936, output of any machine-learning models described in this disclosure, or the like. In some embodiments, determining pricing datum 940 may include updating pricing training data 948 based on previously extracted elements of mechanical part data 920 and requirement fulfillment records from past quality assurance data 932 and retraining the pricing machine-learning model 952 using the updated pricing training data 948. In some embodiments, processor 904 may be configured to generate pricing machine-learning model 952. In a non-limiting example, generating pricing machine-learning model 952 may include training, retraining, or fine-tuning pricing machine-learning model 952 using pricing training data 948 or updated pricing training data 948. In some embodiments, processor 904 may be configured to part revision datum 936 using pricing machine-learning model 952 (i.e. trained or updated pricing machine-learning model 952). In some embodiments, generating training data and training machine-learning models may be simultaneous.

With continued reference to FIG. 9, in some embodiments, determining pricing datum 940 may include simulating, using a machining simulation at a graphic processing unit (GPU), machining for a plurality of correlated manufacturing data 928 and determining the pricing datum 940 as a function of the simulation. The machining simulation and the graphic processing unit disclosed herein are further described above. In a non-limiting example, processor 904 may simulate the manufacturing processes using GPU machining simulation, automatic pin placements, mold flow simulation, and sheet metal folding simulation, and data generated from any simulation above may be fed to pricing machine-learning model 952. In some embodiments, simulations may be carried out on each feature (e.g., mechanical part data 920) for feature-based recognition.

With continued reference to FIG. 9, in some embodiments, determining pricing datum 940 may include determining a predictive close rate 984 as a function of pricing datum 940 and a determined threshold. In some embodiments, processor 904 may determine predictive close rate 984 as a function of manufacturing request datum 108 and pricing datum 940. As a non-limiting example, processor 904 may compare manufacturing request datum 108 and pricing datum 940, using pricing datum 940 as a determined threshold, and may determine predictive close rate 984 based on the comparison. A "determined threshold," as described herein, is a value to which a pricing datum exceeds or does not meet. A "predictive close rate 984," as described herein, is a rate of the likelihood of a supplier to manufacture a part. The predictive close rate 984 and determined threshold described herein are further described above. In some embodiments, determining pricing datum 940 may include determining at least a correlated compatible part element datum 976 as a function of at least an extracted element of mechanical part data 920, wherein the at least a correlated compatible part element datum 976 may include a tolerance datum 980 and determining the pricing datum 940 as a function of the tolerance datum 980. A "correlated compatible part element datum 976," as used herein, is any element of data identifying and/or describing any characteristic of a CNC mechanical part that may affect, modify and/or have an influence on a manufacturing process. Characteristics of a CNC mechanical part that may affect, modify and/or have an influence on the manufacturing process may include characteristics of tools of CNC mechanical part; for instance, diameter of the tools, speed of the mechanical part, and the like. For the purposes of this disclosure, a "tolerance datum" is a data element related to a tolerance that a correlated compatible part element datum 976 can manufacture. As a non-limiting example, tolerance datum 980 may include a range or level of tolerance of correlated compatible part element. In some embodiments, determining pricing datum 940 may include receiving manufacturing request datum and determining pricing datum 940 as a function of manufacturing request datum 108 and past quality assurance data 932. In some embodiments, processor 904 may determine optimum suppliers to manufacture a part according to part model 912 as a function of machinability datum 968 in order to increase cost efficiency. In some embodiments, processor 904 may determine optimum suppliers through the use of machine-learning module or user may manually determine optimum suppliers.

With continued reference to FIG. 9, memory 908 contains instructions configuring processor 904 to generate a graphical user interface 956 displaying manufacturing part data 920 and part revision data 936 on a user device 916. The user device 916 disclosed herein may be consistent with user client device 112 described above. For the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 904. For example, a smart phone, smart, tablet, or laptop operated by a user. In an embodiment, user interface may include a graphical user interface. A "graphical user interface," as used herein, is a graphical form of user interface that allows users to interact with electronic devices. In some embodiments, GUI 956 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

Figure 12:
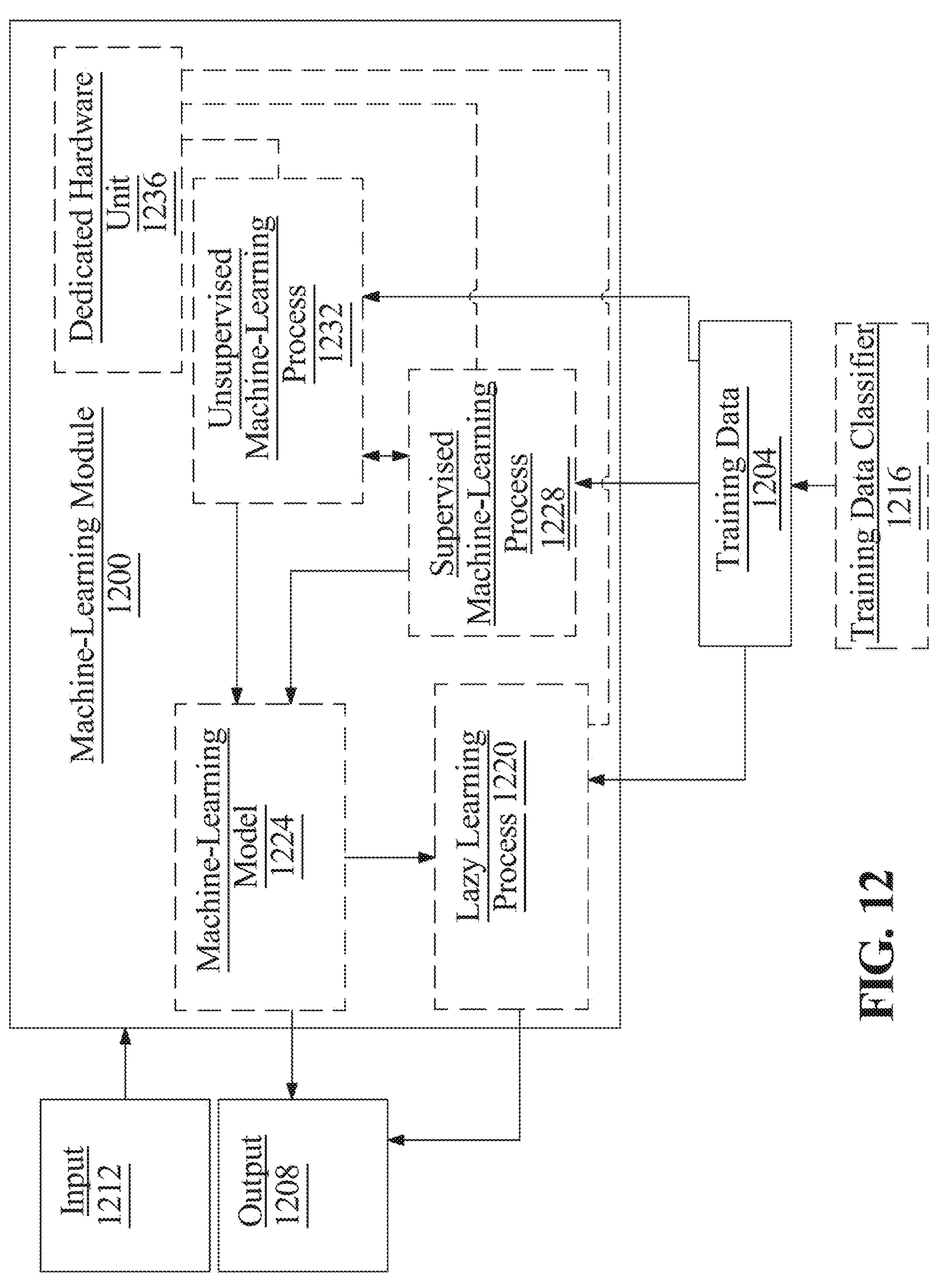
FIG. 12 illustrates a block diagram of an exemplary machine-learning module.

With continue reference to FIG. 9, in some embodiments, generating pricing datum 940 may include receiving a user input 988 for displayed manufacturing part data 920 and displayed part revision data 936 and updating the pricing datum 940 as a function of the user input 988. For the purposes of this disclosure, a "user input" is a data input or command provided by a user to a computer system, software application, or interface. In some embodiments, user input 988 may include text, audio, gestures, button clicks, image, video, or the like. In some embodiments, user input 988 may instruct or request system 900 to perform a specific action, provide information, or engage in a dialogue with user. In a non-limiting example, user may click one of a plurality of displayed part revision data 936 to accept one and processor 904 may generate revised part model 944*a-c* and pricing datum 940*b-d* based on the user input 988. Referring now to FIG. 12, an exemplary embodiment of a machine-learning module 1200 that may perform one or more machine-learning processes as described in this disclosure is illustrated. Machine-learning module may perform determinations, classification, and/or analysis steps, methods, processes, or the like as described in this disclosure using machine-learning processes. A "machine-learning process," as used in this disclosure, is a process that automatedly uses training data 1204 to generate an algorithm instantiated in hardware or software logic, data structures, and/or functions that will be performed by a computing device/module to produce outputs 1208 given data provided as inputs 1212; this is in contrast to a non-machine-learning software program where the commands to be executed are determined in advance by a user and written in a programming language.

With continued reference to FIG. 12, "training data," as used herein, is data containing correlations that a machine-learning process may use to model relationships between two or more categories of data elements. For instance, and without limitation, training data 1204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 1204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1204 according to various correlations; correlations may indicate causative and/or predictive links between categories of data elements, which may be modeled as relationships such as mathematical relationships by machine-learning processes as described in further detail below. Training data 1204 may be formatted and/or organized by categories of data elements, for instance by associating data elements with one or more descriptors corresponding to categories of data elements. As a non-limiting example, training data 1204 may include data entered in standardized forms by persons or processes, such that entry of a given data element in a given field in a form may be mapped to one or more descriptors of categories. Elements in training data 1204 may be linked to descriptors of categories by tags, tokens, or other data elements; for instance, and without limitation, training data 1204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and with continued reference to FIG. 12, training data 1204 may include one or more elements that are not categorized; that is, training data 1204 may not be formatted or contain descriptors for some elements of data. Machine-learning algorithms and/or other processes may sort training data 1204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1204 to be made applicable for two or more distinct machine-learning algorithms as described in further detail below. Training data 1204 used by machine-learning module 1200 may correlate any input data as described in this disclosure to any output data as described in this disclosure. As a non-limiting illustrative example, input data may include part model 912, mechanical part data 920, part revision datum 936, pricing datum 940*a-d*, machinability datum 968, output of any machine-learning models, predictive close rate 984, user input 988, and the like. As a non-limiting illustrative example, output data may include part model 912, mechanical part data 920, part revision datum 936, pricing datum 940*a-d*, machinability datum 968, output of any machine-learning models, predictive close rate 984, user input 988, and the like.

Further referring to FIG. 12, training data may be filtered, sorted, and/or selected using one or more supervised and/or unsupervised machine-learning processes and/or models as described in further detail below; such models may include without limitation a training data classifier 1216. Training data classifier 1216 may include a "classifier," which as used in this disclosure is a machine-learning model as defined below, such as a data structure representing and/or using a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 1200 may generate a classifier using a classification algorithm, defined as a process whereby a computing device and/or any module and/or component operating thereon derives a classifier from training data 1204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1216 may classify elements of training data to supplier cohort, user cohort or part cohort. As a non-limiting example, training data classifier 1216 may classify elements of training data to supplier cohort related to different types, industries, sizes, and the like of suppliers who manufacture a part or inputs manufacturing request datum 108. As a non-limiting example, training data classifier 1216 may classify elements of training data to user cohort related to different types, industries, sizes, and the like of users who request suppliers to manufacture a part. As a non-limiting example, training data classifier 1216 may classify elements of training data to part cohort related to different types, materials, and the like.

With continued reference to FIG. 12, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\pm P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 12, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 12, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 12, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input 988, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

With continued reference to FIG. 12, computer, processor, and/or module may be configured to preprocess training data. "Preprocessing" training data, as used in this disclosure, is transforming training data from raw form to a format that can be used for training a machine-learning model. Preprocessing may include sanitizing, feature selection, feature scaling, data augmentation and the like.

With continued reference to FIG. 12, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 12, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

With continued reference to FIG. 12, computing device, processor, and/or module may be configured to precondition one or more training examples. For instance, and without limitation, where a machine-learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs down sampled to smaller numbers of units, and a neural network or other machine-learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been down sampled to smaller numbers of pixels, and a neural network or other machine-learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 12, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 12, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 12, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 12, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

With continued reference to FIG. 12, machine-learning module 1200 may be configured to perform a lazy-learning process 1220 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1204. Heuristic may include selecting some number of highest-ranking associations and/or training data 1204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 12, machine-learning processes as described in this disclosure may be used to generate machine-learning models 1224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 1224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1224 may be generated by creating an artificial neural network, such as a convolutional neural network comprising an input layer of nodes, one or more intermediate layers, and an output layer of nodes. Connections between nodes may be created via the process of "training" the network, in which elements from a training data 1204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 12, machine-learning algorithms may include at least a supervised machine-learning process 1228. At least a supervised machine-learning process 1228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include part model 912, mechanical part data 920, part revision datum 936, pricing datum 940*a-d*, machinability datum 968, output of any machine-learning models, predictive close rate 984, user input 988, and the like as described above as inputs part model 912, mechanical part data 920, part revision datum 936, pricing datum 940*a-d*, machinability datum 968, output of any machine-learning models, predictive close rate 984, user input 988, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1204. Persons skilled in the art, upon reviewing the entirety of this disclosure, will be aware of various possible variations of at least a supervised machine-learning process 1228 that may be used to determine relation between inputs and outputs. Supervised machine-learning processes may include classification algorithms as defined above.

With further reference to FIG. 12, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

With continued reference to FIG. 12, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 12, machine-learning processes may include at least an unsupervised machine-learning processes 1232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 1232 may not require a response variable; unsupervised processes 1232 may be used to find interesting patterns and/or inferences between variables, to determine a degree of correlation between two or more variables, or the like.

With continued reference to FIG. 12, machine-learning module 1200 may be designed and configured to create a machine-learning model 1224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 12, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

With continued reference to FIG. 12, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

With continued reference to FIG. 12, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/ or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user input 988s indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

With continued reference to FIG. 12, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 12, one or more processes or algorithms described above may be performed by at least a dedicated hardware unit 1236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 1236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 1236 may include, without limitation, graphical processing unit 140s (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 1236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 13:
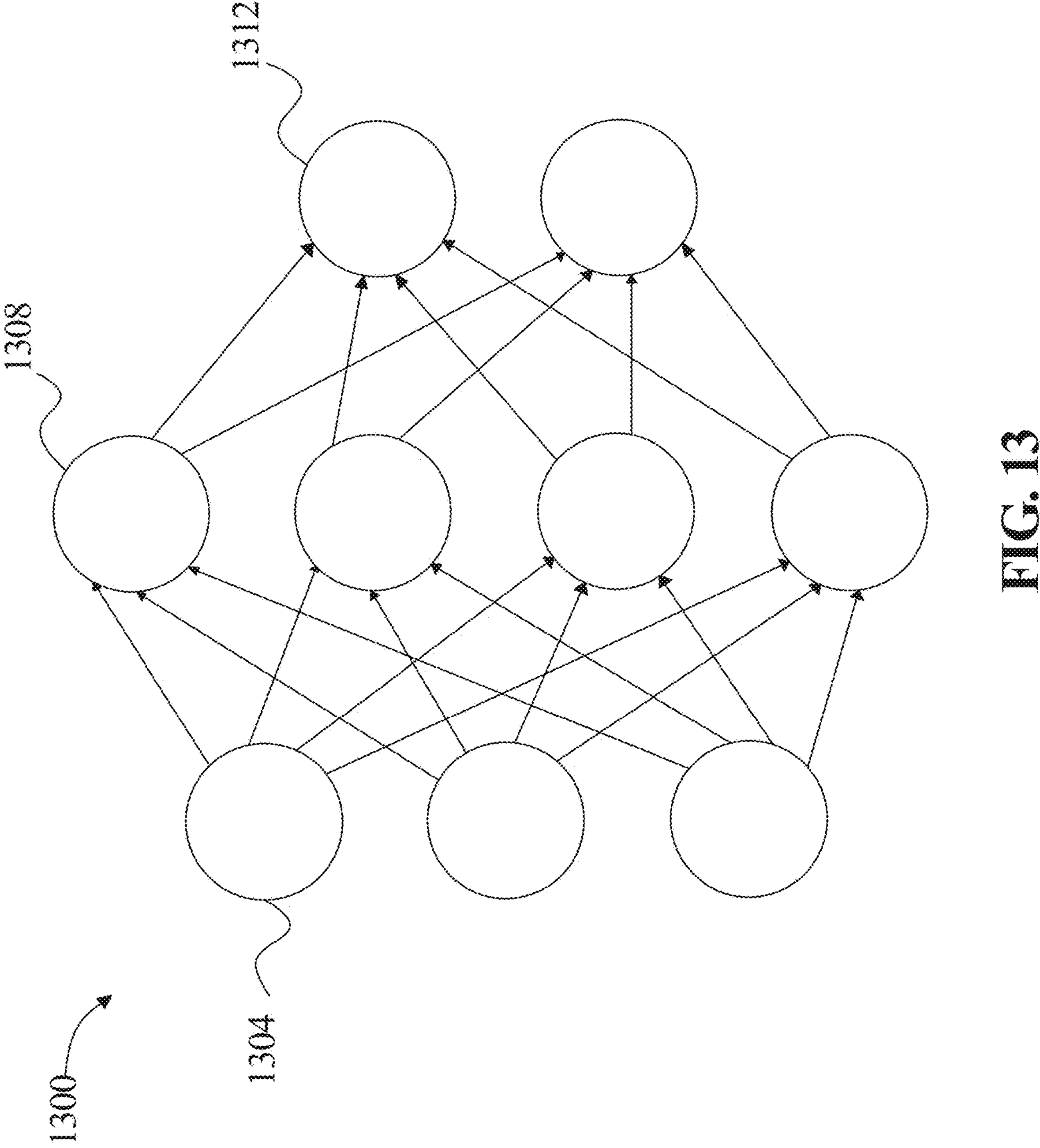
FIG. 13 illustrates a diagram of an exemplary neural network.

Referring now to FIG. 13, an exemplary embodiment of neural network 1300 is illustrated. A neural network 1300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 1304, one or more intermediate layers 1308, and an output layer of nodes 1312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 14:
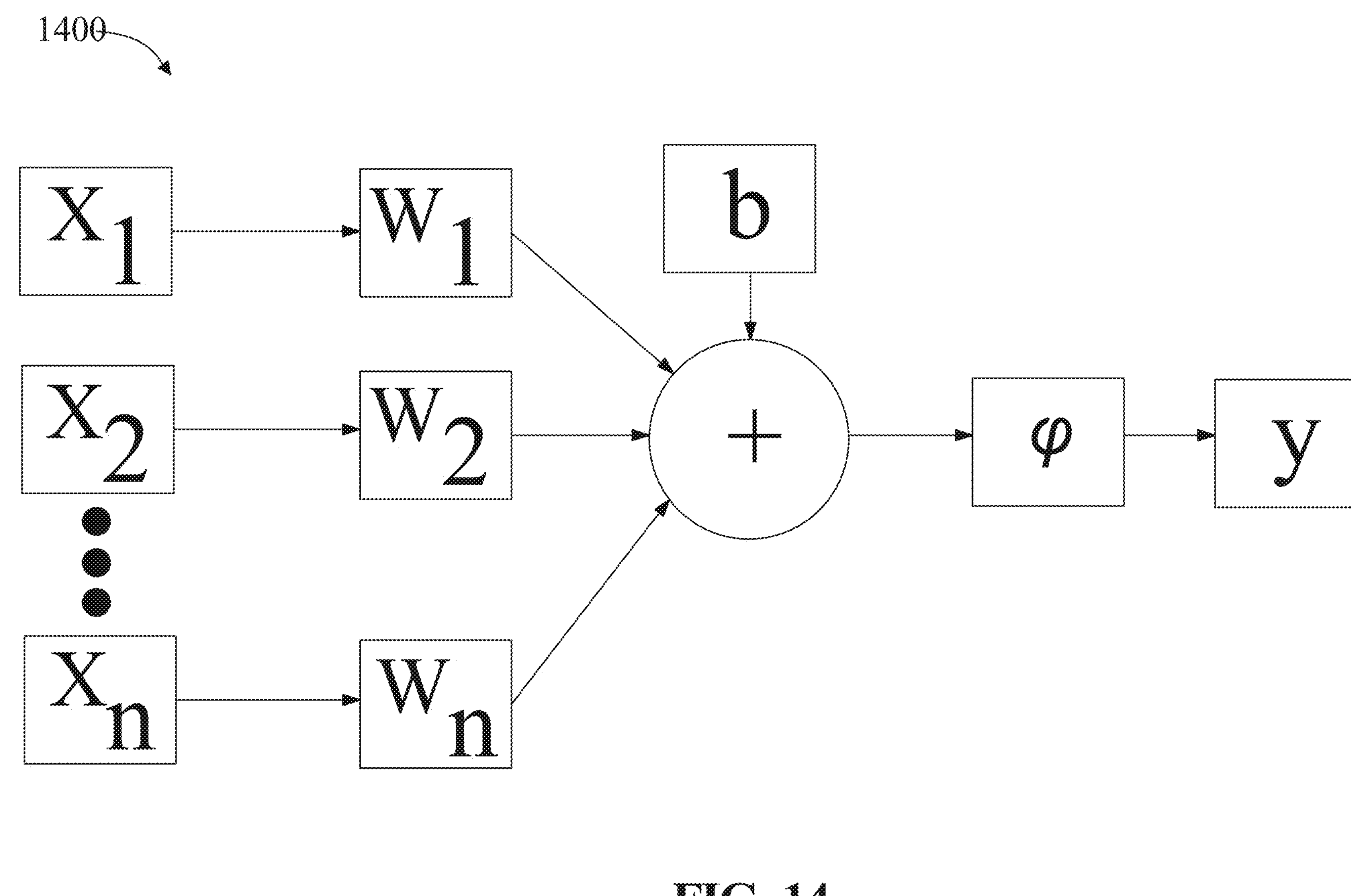
FIG. 14 illustrates a block diagram of an exemplary node in a neural network.

Referring now to FIG. 14 an exemplary embodiment of a node 1400 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as f(x)=tan $h^2$(x), a rectified linear unit function such as f(x)=max(0, x), a "leaky" and/or "parametric" rectified linear unit function such as f(x)=max (ax, x) for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\Sigma_i x_i}$$

where the inputs to an instant layer are $x_i$, a swish function such as f(x)=x*sigmoid(x), a Gaussian error linear unit function such as f(x)=a(1+tan h($\sqrt{2/\pi}$(x+bx^r))) for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function q, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 15:
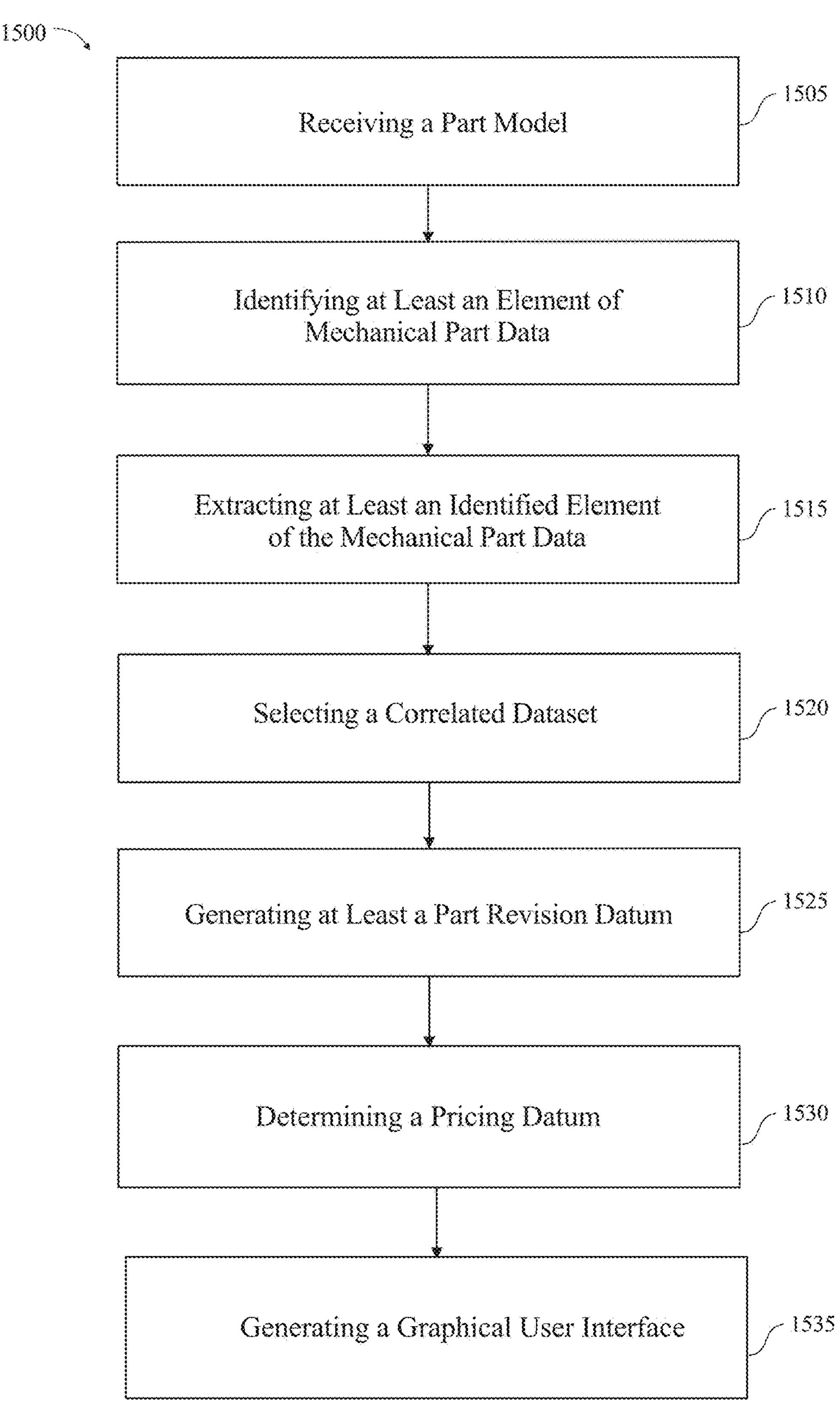
FIG. 15 illustrates a flow diagram of an exemplary method for making prediction associated with any subtractively manufactured part using artificial intelligence.

Referring now to FIG. 15, a flow diagram of an exemplary method 1500 for making prediction associated with a subtractively manufactured part using artificial intelligence at a computing device is illustrated. Method 1500 contains a step 1505 of receiving, by a computing device, a part model. This may be implemented as reference to FIGS. 1-14.

With continued reference to FIG. 15, method 1500 contains a step 1510 of identifying, by a computing device, at least an element of mechanical part data as a function of the part model. In some embodiments, identifying the at least an element of the mechanical part data may include analyzing, using a machine vision system operating on the computing device, the part model for the at least an element of mechanical part data, wherein the part model may include a three-dimensional part model. In some embodiments, identifying the at least an element of the mechanical part data may include analyzing, using an optical character recognition operating on the computing device, the part model for the at least an element of mechanical part data, wherein the part model may include a two-dimensional part model. These may be implemented as reference to FIGS. 1-14.

With continued reference to FIG. 15, method 1500 contains a step 1515 of extracting, by a computing device, at least an identified element of the mechanical part data. This may be implemented as reference to FIGS. 1-14.

With continued reference to FIG. 15, method 1500 contains a step 1520 of selecting, by a computing device, a correlated dataset including a plurality of data entries as a function of an extracted element of mechanical part data, wherein each data entry includes a plurality of correlated manufacturing data, and wherein the plurality of correlated manufacturing data further includes at least a requirement fulfillment record from past quality assurance data. This may be implemented as reference to FIGS. 1-14.

With continued reference to FIG. 15, method 1500 contains a step 1525 of generating, by a computing device, at least a part revision datum for a plurality of correlated manufacturing data. In some embodiments, generating the at least a part revision datum may include determining a machinability datum 968 as a function of the at least an extracted element of the mechanical part data and generating the at least a part revision datum as a function of the machinability datum 968. In some embodiments, the at least a part revision datum may include a defeaturing modification 972. These may be implemented as reference to FIGS. 1-14.

With continued reference to FIG. 15, method 1500 contains a step 1530 of determining, by a computing device, a pricing datum as a function of an extracted element of mechanical part data and correlated manufacturing data, wherein determining the pricing datum further includes generating pricing training data, wherein the pricing training data includes exemplary part revision data correlated to exemplary pricing data, training, iteratively, a pricing machine-learning model using the pricing training data and generating the pricing datum as a function of the pricing machine-learning model. In some embodiments, determining the pricing datum may include updating the pricing training data based on previously extracted elements of the mechanical part data and the requirement fulfillment records from the past quality assurance data and retraining the pricing machine-learning model using the updated pricing training data. In some embodiments, determining the pricing datum may include simulating, using a machining simulation at a graphic processing unit operating on the computing device, machining for the plurality of correlated manufacturing datum and determining the pricing datum as a function of the simulation. In some embodiments, determining the pricing datum may include determining a predictive close rate 984 as a function of the pricing datum and a determined threshold. In some embodiments, determining the pricing datum may include determining at least a correlated compatible part element datum 976 as a function of the at least an extracted element of the mechanical part data, wherein the at least a correlated compatible part element datum 976 may include a tolerance datum 980 and determining the pricing datum as a function of the tolerance datum 980. In some embodiments, determining the pricing datum may include receiving a user input 988 for the displayed manufacturing part data and the displayed part revision data and updating the pricing datum as a function of the user input 988. These may be implemented as reference to FIGS. 1-14.

With continued reference to FIG. 15, method 1500 contains a step 1535 of generating, by a computing device, a graphical user interface displaying manufacturing part data and part revision data on a user device. This may be implemented as reference to FIGS. 1-14.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 16:
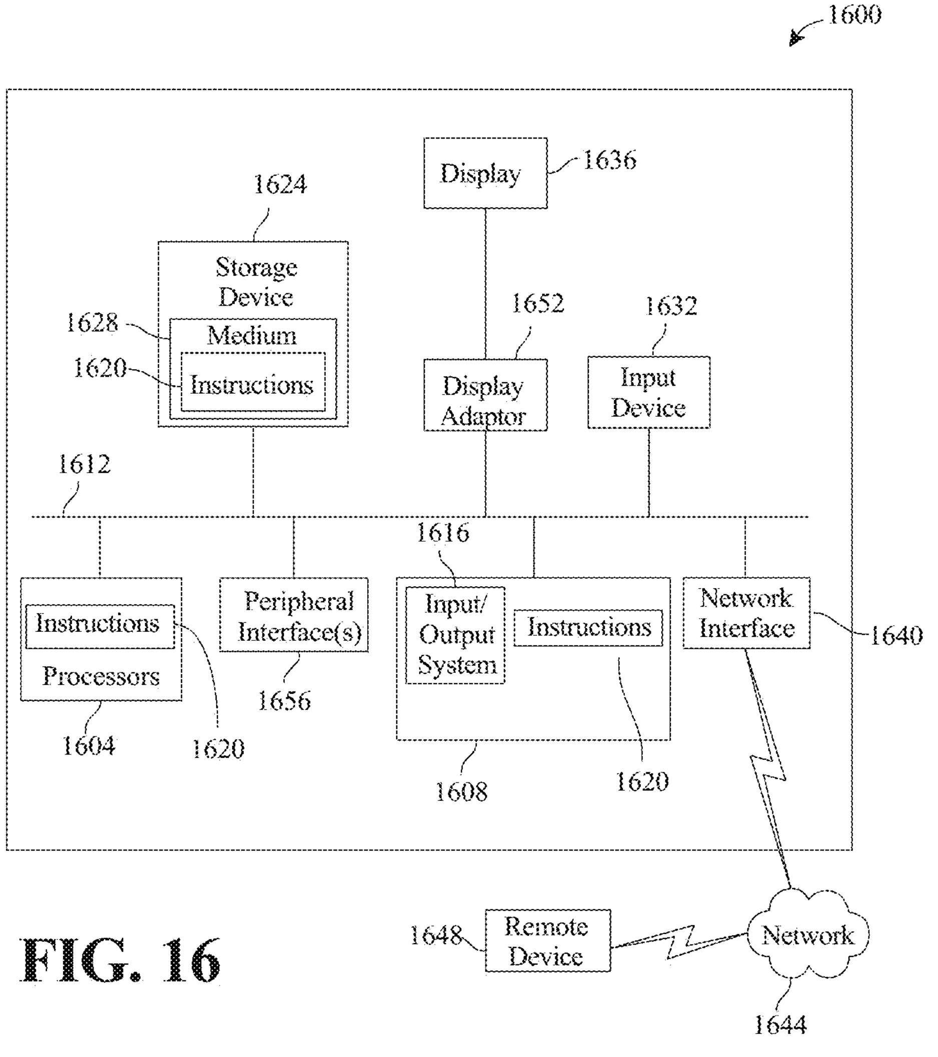
FIG. 16 is a block diagram of a computing system that can be used to implement any one or more of the methodologies disclosed herein and any one or more portions thereof.

FIG. 16 shows a diagrammatic representation of one embodiment of a computing device in the exemplary form of a computer system 1600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1600 includes a processor 1604 and a memory 1608 that communicate with each other, and with other components, via a bus 1612. Bus 1612 may include any of several types of bus structures including, but not limited to, a memory bus, a memory controller, a peripheral bus, a local bus, and any combinations thereof, using any of a variety of bus architectures.

Memory 1608 may include various components (e.g., machine-readable media) including, but not limited to, a random-access memory component, a read only component, and any combinations thereof. In one example, a basic input/output system 1616 (BIOS), including basic routines that help to transfer information between elements within computer system 1600, such as during start-up, may be stored in memory 1608. Memory 1608 may also include (e.g., stored on one or more machine-readable media) instructions (e.g., software) 1620 embodying any one or more of the aspects and/or methodologies of the present disclosure. In another example, memory 1608 may further include any number of program modules including, but not limited to, an operating system, one or more application programs, other program modules, program data, and any combinations thereof.

Computer system 1600 may also include a storage device 1624. Examples of a storage device (e.g., storage device 1624) include, but are not limited to, a hard disk drive, a magnetic disk drive, an optical disc drive in combination with an optical medium, a solid-state memory device, and any combinations thereof. Storage device 1624 may be connected to bus 1612 by an appropriate interface (not shown). Example interfaces include, but are not limited to, SCSI, advanced technology attachment (ATA), serial ATA, universal serial bus (USB), IEEE 13164 (FIREWIRE), and any combinations thereof. In one example, storage device 1624 (or one or more components thereof) may be removably interfaced with computer system 1600 (e.g., via an external port connector (not shown)). Particularly, storage device 1624 and an associated machine-readable medium 1628 may provide nonvolatile and/or volatile storage of machine-readable instructions, data structures, program modules, and/or other data for computer system 1600. In one example, software 1620 may reside, completely or partially, within machine-readable medium 1628. In another example, software 1620 may reside, completely or partially, within processor 1604.

Computer system 1600 may also include an input device 1632. In one example, a user of computer system 1600 may enter commands and/or other information into computer system 1600 via input device 1632. Examples of an input device 1632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1632 may be interfaced to bus 1612 via any of a variety of interfaces (not shown) including, but not limited to, a serial interface, a parallel interface, a game port, a USB interface, a FIREWIRE interface, a direct interface to bus 1612, and any combinations thereof. Input device 1632 may include a touch screen interface that may be a part of or separate from display 1636, discussed further below. Input device 1632 may be utilized as a user selection device for selecting one or more graphical representations in a graphical interface as described above.

A user may also input commands and/or other information to computer system 1600 via storage device 1624 (e.g., a removable disk drive, a flash drive, etc.) and/or network interface device 1640. A network interface device, such as network interface device 1640, may be utilized for connecting computer system 1600 to one or more of a variety of networks, such as network 1644, and one or more remote devices 1648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1644, may employ a wired and/or a wireless mode of communication. In general, any network topology may be used. Information (e.g., data, software 1620, etc.) may be communicated to and/or from computer system 1600 via network interface device 1640.

Computer system 1600 may further include a video display adapter 1652 for communicating a displayable image to a display device, such as display 1636. Examples of a display device include, but are not limited to, a liquid crystal display (LCD), a cathode ray tube (CRT), a plasma display, a light emitting diode (LED) display, and any combinations thereof. Display adapter 1652 and display 1636 may be utilized in combination with processor 1604 to provide graphical representations of aspects of the present disclosure. In addition to a display device, computer system 1600 may include one or more other peripheral output devices including, but not limited to, an audio speaker, a printer, and any combinations thereof. Such peripheral output devices may be connected to bus 1612 via a peripheral interface 1656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for making prediction associated with a subtractively manufactured part using artificial intelligence at a computing device, the method comprising:

receiving, by a computing device, a part model;

identifying, by the computing device, at least an element of mechanical part data as a function of the part model;

extracting, by the computing device, at least an identified element of the mechanical part data;

selecting, by the computing device, a correlated dataset comprising a plurality of data entries as a function of the extracted element of the mechanical part data, wherein each data entry comprises a plurality of correlated manufacturing data, and wherein the plurality of correlated manufacturing data further comprises at least a requirement fulfillment record from past quality assurance data;

generating, by the computing device, at least a part revision datum for the plurality of correlated manufacturing data;

determining, by the computing device, a pricing datum as a function of the extracted element of the mechanical part data and the correlated manufacturing data, wherein determining the pricing datum further comprises:

generating pricing training data, wherein the pricing training data comprises exemplary part revision data correlated to exemplary pricing data;

training, iteratively, a pricing machine-learning model using the pricing training data;

updating the pricing training data based on the extracted element of the mechanical part data and the requirement fulfillment records from the past quality assurance data;

retraining the pricing machine-learning model using the updated pricing training data; and generating the pricing datum as a function of the retrained pricing machine-learning model; and generating, by the computing device, a graphical user interface displaying the mechanical part data and the part revision datum on a user device.

2. The method of claim 1, wherein identifying the at least an element of the mechanical part data comprises analyzing, using a machine vision system operating on the computing device, the part model for the at least an element of mechanical part data, wherein the part model comprises a three-dimensional part model.

3. The method of claim 1, wherein identifying the at least an element of the mechanical part data comprises analyzing, using an optical character recognition operating on the computing device, the part model for the at least an element of mechanical part data, wherein the part model comprises a two-dimensional part model.

4. The method of claim 1, wherein generating the at least a part revision datum comprises:

determining a machinability datum as a function of the at least an extracted element of the mechanical part data; and generating the at least a part revision datum as a function of the machinability datum.

5. The method of claim 1, wherein the at least a part revision datum comprises a defeaturing modification.

6. The method of claim 1, wherein determining the pricing datum comprises:

simulating, using a machining simulation at a graphic processing unit operating on the computing device, machining for the plurality of correlated manufacturing data; and determining the pricing datum as a function of the simulation.

7. The method of claim 1, wherein determining the pricing datum comprises determining a predictive close rate as a function of the pricing datum and a determined threshold.

8. The method of claim 1, wherein determining the pricing datum comprises:

determining at least a correlated compatible part element datum as a function of the at least an extracted element of the mechanical part data, wherein the at least a correlated compatible part element datum comprises a tolerance datum; and determining the pricing datum as a function of the tolerance datum.

9. The method of claim 1, wherein determining the pricing datum comprises:

receiving a user input for the displayed mechanical part data and the displayed part revision datum; and updating the pricing datum as a function of the user input.

10. The method of claim 1, wherein the requirement fulfillment record comprises an indication of whether a manufactured part satisfied at least one predetermined quality requirement.

11. A system for making prediction associated with any subtractively manufactured part using artificial intelligence, the system comprising:

at least a processor; and a memory communicatively connected to the at least a processor, wherein the memory contains instructions configuring the at least a processor to:

receive a part model;

identify at least an element of mechanical part data as a function of the part model;

extract at least an identified element of the mechanical part data;

select a correlated dataset comprising a plurality of data entries as a function of the extracted element of the mechanical part data, wherein each data entry comprises a plurality of correlated manufacturing data, and wherein the plurality of correlated manufacturing data further comprises at least a requirement fulfillment record from past quality assurance data;

generate at least a part revision datum for the plurality of correlated manufacturing data;

determine a pricing datum as a function of the extracted element of the mechanical part data and the correlated manufacturing data, wherein determining the pricing datum further comprises:

generating pricing training data, wherein the pricing training data comprises exemplary part revision data correlated to exemplary pricing data;

training, iteratively, a pricing machine-learning model using the pricing training data;

updating the pricing training data based on the extracted element of the mechanical part data and the requirement fulfillment records from the past quality assurance data;

retraining the pricing machine-learning model using the updated pricing training data; and generating the pricing datum as a function of the pricing machine-learning model; and generate a graphical user interface displaying the mechanical part data and the part revision datum on a user device.

12. The system of claim 11, wherein identifying the at least an element of the mechanical part data comprises analyzing, using a machine vision system, the part model for the at least an element of mechanical part data, wherein the part model comprises a three-dimensional part model.

13. The system of claim 11, wherein identifying the at least an element of the mechanical part data comprises analyzing, using an optical character recognition, the part model for the at least an element of mechanical part data, wherein the part model comprises a two-dimensional part model.

14. The system of claim 11, wherein generating the at least a part revision datum comprises:

determining a machinability datum as a function of the at least an extracted element of the mechanical part data; and generating the at least a part revision datum as a function of the machinability datum.

15. The system of claim 11, wherein the at least a part revision datum comprises a defeaturing modification.

16. The system of claim 11, wherein determining the pricing datum comprises:

simulating, using a machining simulation at a graphic processing unit, machining for the plurality of correlated manufacturing data; and determining the pricing datum as a function of the simulation.

17. The system of claim 11, wherein determining the pricing datum comprises determining a predictive close rate as a function of the pricing datum and a determined threshold.

18. The system of claim 11, wherein determining the pricing datum comprises:

determining at least a correlated compatible part element datum as a function of the at least an extracted element of the mechanical part data, wherein the at least a correlated compatible part element datum comprises a tolerance datum; and determining the pricing datum as a function of the tolerance datum.

19. The system of claim 11, wherein determining the pricing datum comprises:

receiving a user input for the displayed mechanical part data and the displayed part revision datum; and updating the pricing datum as a function of the user input.

20. The system of claim 11, wherein the requirement fulfillment record comprises an indication of whether a manufactured part satisfied at least one predetermined quality requirement.

* * * * *